US009213633B2

(12) United States Patent
Canepa et al.

(10) Patent No.: US 9,213,633 B2
(45) Date of Patent: Dec. 15, 2015

(54) FLASH TRANSLATION LAYER WITH LOWER WRITE AMPLIFICATION

(71) Applicant: Seagate Technology LLC, Cupertino, CA (US)

(72) Inventors: Timothy L. Canepa, Los Gatos, CA (US); Earl T. Cohen, Oakland, CA (US); Alex G. Tang, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 288 days.

(21) Appl. No.: 13/889,521

(22) Filed: May 8, 2013

(65) Prior Publication Data

US 2014/0325117 A1 Oct. 30, 2014

Related U.S. Application Data

(60) Provisional application No. 61/817,441, filed on Apr. 30, 2013.

(51) Int. Cl.
*G06F 12/02* (2006.01)

(52) U.S. Cl.
CPC .... *G06F 12/0246* (2013.01); *G06F 2212/7201* (2013.01)

(58) Field of Classification Search
CPC .......... G06F 12/0246; G06F 2212/222; G06F 12/10; G06F 2212/7201; G06F 12/0238; G06F 3/0679; G06F 2212/2022
USPC .................................. 711/103, 202, 203, 206
See application file for complete search history.

(56) References Cited

U.S. PATENT DOCUMENTS

| | | | |
|---|---|---|---|
| 6,763,424 B2 | 7/2004 | Conley | 711/103 |
| 7,480,766 B2 | 1/2009 | Gorobets | 711/115 |
| 7,594,073 B2 | 9/2009 | Hanebutte et al. | 711/113 |
| 8,402,205 B2 | 3/2013 | Goss et al. | 711/103 |
| 2006/0174067 A1 | 8/2006 | Soules et al. | 711/135 |
| 2010/0070735 A1 | 3/2010 | Chen et al. | 711/206 |
| 2010/0169710 A1 | 7/2010 | Royer, Jr. et al. | 714/22 |
| 2011/0231596 A1 | 9/2011 | Goss et al. | 711/103 |
| 2014/0258588 A1* | 9/2014 | Tomlin et al. | 711/103 |

FOREIGN PATENT DOCUMENTS

EP 0898228 B1 7/1998 ............ G06F 11/10

* cited by examiner

*Primary Examiner* — Jasmine Song
(74) *Attorney, Agent, or Firm* — Christopher P. Maiorana, PC

(57) ABSTRACT

A method of associating a logical block address with a physical location in a non-volatile memory includes (A) in response to a write request comprising a respective logical block address in a logical block address space and respective data to be written to the non-volatile memory, determining a physical location in the non-volatile memory to store the respective data of the write request, (B) adding an entry to a journal, such that the added entry trails any entries already in the journal and the added entry has a respective logical block address field set to the respective logical block address of the write request and a respective physical location field set to the determined physical location, and (C) updating one of a plurality of second-level map pages in a two-level map according to the respective logical block address of the write request with the determined physical location.

20 Claims, 11 Drawing Sheets

FLASH TRANSLATION LAYER WITH LOWER WRITE AMPLIFICATION

This application relates to U.S. Provisional Application No. 61/817,441, filed Apr. 30, 2013, which is hereby incorporated by reference in its entirety.

FIELD OF THE INVENTION

The invention relates to non-volatile memory management generally and, more particularly, to a method and/or apparatus for implementing a flash translation layer with lower write amplification.

BACKGROUND

A Flash Translation Layer (FTL), or map, provides a translation from logical block addresses (LBAs) in a logical block address space (such as used by a host) to physical addresses in a non-volatile memory (NVM) of an input/output (I/O) device, such as a solid-state disk/drive (SSD). Solid-state disks/drives (SSDs) using some NVM types such as NAND flash use garbage collection (or recycling) to reclaim free space created when an logical block address (LBA) is overwritten with new data (rendering a previous physical location associated with that LBA unused). Garbage collection causes write amplification—a multiplicative factor on the amount of host data written versus the amount of data written to NVM. There are multiple components of write amplification, including a data component of write amplification (termed data write amplification) and a map component of write amplification (termed map write amplification). The data write amplification arises from recycling of host write data (also termed user data). The map write amplification arises from a need to save the FTL non-volatility and any necessary recycling of the FTL. In SSDs that reduce the user data, the map write amplification is a larger fraction of the total write amplification, since the data write amplification is decreased. It would be desirable to have a method and/or apparatus for implementing a flash translation layer with lower write amplification.

SUMMARY

The invention concerns a method of associating a logical block address with a physical location in a non-volatile memory. In response to a write request comprising a respective logical block address in a logical block address space and respective data to be written to the non-volatile memory, a physical location in the non-volatile memory to store the respective data of the write request is determined. An entry is added to a journal, such that the added entry trails any entries already in the journal. The added entry has a respective logical block address field set to the respective logical block address of the write request and a respective physical location field set to the determined physical location in the non-volatile memory to store the respective data of the write request. One of a plurality of second-level map pages in a two-level map is updated according to the respective logical block address of the write request with the determined physical location. The two-level map is formed by each of the plurality of second-level map pages being associated with a respective one of a plurality of first-level map entries.

BRIEF DESCRIPTION OF THE FIGURES

Embodiments of the invention will be apparent from the following detailed description and the appended claims and drawings in which:

DETAILED DESCRIPTION OF THE PREFERRED EMBODIMENTS

Because every host write (or write request, or write command) is mapped (e.g., by a flash translation layer, or FTL) to a (typically different) physical location, the FTL needs to be saved non-volatility. If the FTL is not saved non-volatility, later attempts to access previously written data may not be able to return the most-recently-written data, because the association between an LBA of the data and a physical location in the non-volatile memory (NVM) storing the data has been lost.

One type of FTL uses a journal (or log). As host writes arrive at an input/output device such as a solid-state disk/drive (SSD), a journal is kept with entries associating an LBA of each write with an assigned physical address in NVM of data of the write. The physical address is also stored in a map (such as a one-level flat map associating LBAs with respective physical addresses) that is maintained in volatile memory such as dynamic random access memory (DRAM). A journal entry is on the order of 8B in size, such as 4B of LBA and 4B of physical address, though the size of these fields varies according to capacity of the SSD, over-provisioning of the SSD, and other factors. The journal entries are saved in static random access memory (SRAM), such as on-chip in an SSD controller, or in DRAM (e.g., external to the SSD controller). When a specified amount of journal entries (e.g., one NVM page) is accumulated, that portion of the journal is saved non-volatility.

As the journal becomes larger (e.g., grows in the number of entries), the recovery time (such as after a power failure) is increased because the entire journal needs to be read (or replayed) to rebuild the map with the latest logical to physical translations. Accordingly, when the journal reaches a certain size, the entire map is saved to NVM and then the journal can be cleared. The resulting map write amplification is a combination of saving the journal entries per host write, and the periodic flushing of the entire map. Recovery time increases inversely with the map write amplification. For example, larger journal size reduces map write amplification (by amortizing a cost of saving the map over more host writes), but increases recovery time after a power failure.

Embodiments of the invention include providing a flash translation layer (FTL) with lower write amplification that may (i) employ a combination of journaling and multi-level (e.g., two-level) mapping, (ii) provide deadline-based flushing of second-level map pages, (iii) maximize aggregation of updates, and/or (iv) reduce a map portion of write amplification significantly.

Figure 1:
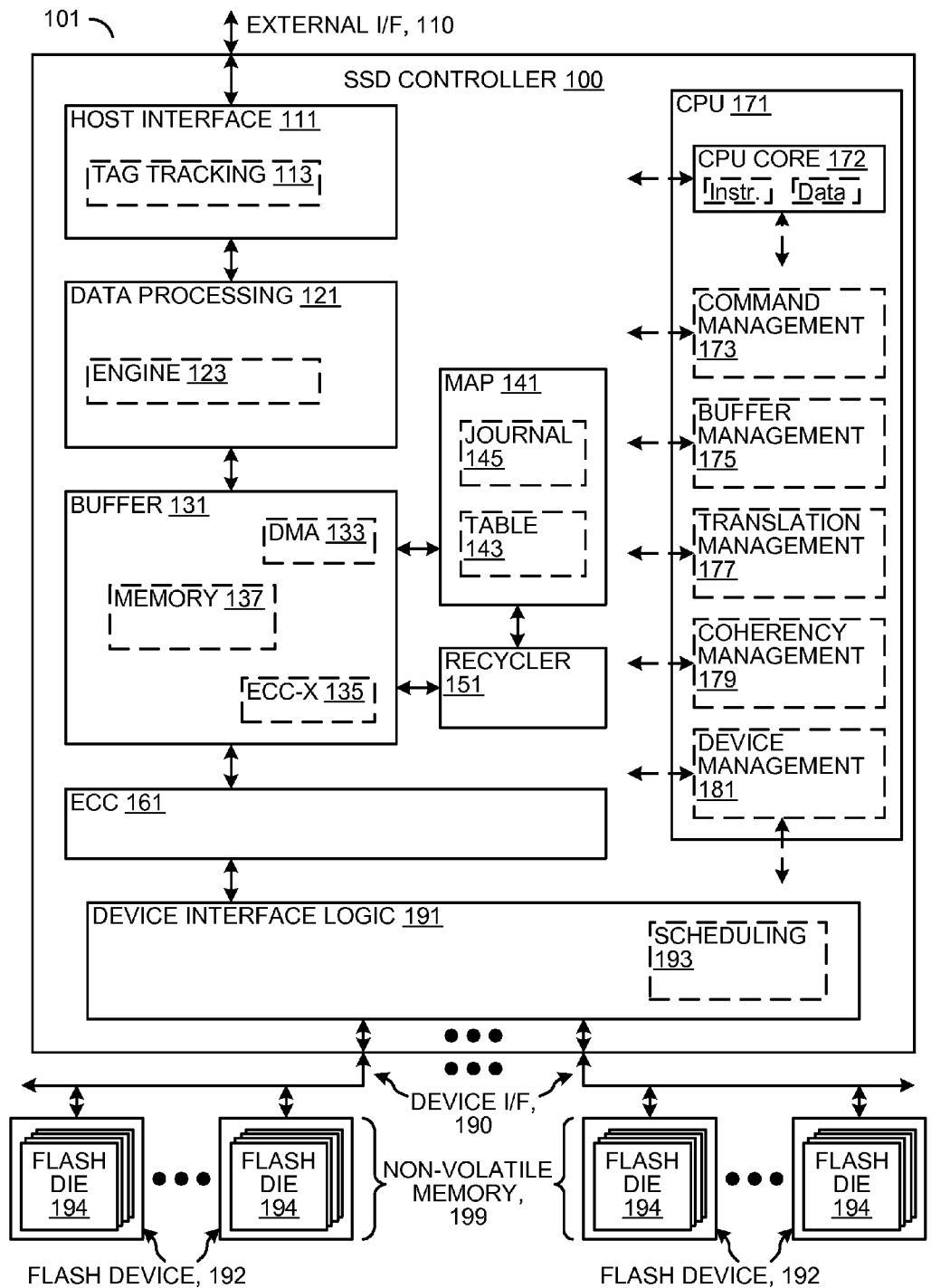
FIG. 1 is a diagram illustrating an embodiment of a Solid-State Disk/Drive (SSD) including an SSD controller implementing a flash translation layer (FTL) in accordance with embodiments of the invention.

Referring to FIG. 1, a diagram is shown illustrating a solid-state disk (SSD) 101 including an SSD controller 100 in which a flash translation layer in accordance with an embodiment of the invention may be implemented to manage data in non-volatile (e.g., flash) memory, reducing write amplification significantly. The SSD controller 100 may be coupled via one or more external interfaces 110 to a host 102 (described below in connection with FIG. 2). According to various embodiments, external interfaces 110 are one or more of: a serial advanced technology attachment (SATA) interface; a serial attached small computer system interface (serial SCSI or SAS interface); a (peripheral component interconnect express (PCIe) interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, the SSD controller 100 includes a SATA interface and a PCIe interface.

The SSD controller 100 is further coupled via one or more device interfaces 190 to non-volatile memory 199 including one or more storage devices, such as non-volatile memory devices 192. According to various embodiments, device interfaces 190 are one or more of: an asynchronous interface; a synchronous interface; a double data rate (DDR) synchronous interface; an ONFI (open NAND flash interface) compatible interface, such as an ONFI 2.2 compatible interface; a Toggle-mode compatible non-volatile memory interface; a non-standard version of any of the preceding interfaces; a custom interface; or any other type of interface used to connect to storage devices.

The non-volatile memory devices 192 have, in some embodiments, one or more individual non-volatile memory die 194. According to a type of a particular one of the non-volatile memory devices 192, a plurality of non-volatile memory die 194 in the particular non-volatile memory device 192 are optionally and/or selectively accessible in parallel. The non-volatile memory devices 192 are generally representative of one type of storage device enabled to communicatively couple to the SSD controller 100. However, in various embodiments, any type of storage device is usable, such as an SLC (single-level cell) NAND flash memory, MLC (multi-level cell) NAND flash memory, TLC (triple-level cell) NAND flash memory, NOR flash memory, read-only memory (ROM), static random access memory (SRAM), dynamic random access memory (DRAM), magneto-resistive random-access memory (MRAM), ferromagnetic memory (e.g., FeRAM, F-RAM FRAM, etc.), phase-change memory (e.g., PRAM, PCRAM, etc.), racetrack memory (or domain-wall memory (DWM)), resistive random access memory (ReRAM), or any other type of memory device or storage medium.

According to various embodiments, the device interfaces 190 are organized as: one or more busses with one or more non-volatile memory devices 192 per bus; one or more groups of busses with one or more non-volatile memory devices 192 per bus, where busses in a group are generally accessed in parallel; or any other organization of non-volatile memory devices 192 coupled to device interfaces 190.

In general, the number of device interfaces 190 implemented may be varied between embodiments. In various embodiments, the device interfaces 190 are implemented as flash channels (or flash lanes), each of which has one or more flash devices 192, each of which has one or more flash die 194. For example, in some embodiments, each flash device 192 is configured as a single package with 2 channels and with 2N flash die 194, having N die on one channel, and N die on another channel. The package supports more than one channel to have more bandwidth. In various embodiments, board-level constraints may dictate a particular configuration, though factors like delivered bandwidth and capacity may come into play, too. For example, a non-volatile memory device 192 having four channels in one package (e.g., that might have four or 8 die—either 1 or 2 per channel) may be implemented in order to increase bandwidth (e.g., more channels) without increasing board real estate (e.g., occupying less area than 2 packages, each of which has only 2 channels).

The SSD controller 100 may have one or more modules, such as a host interface module 111, a data processing module 121, a buffer 131, a map 141, a recycler 151, an error-correcting code (ECC) module 161, a central processing unit (CPU) 171, and device interface logic 191. The specific modules and interconnections illustrated in FIG. 1 are merely representative of one embodiment, and many arrangements and interconnections of some or all of the modules, as well as additional modules not illustrated, may be implemented to meet the design criteria of a particular implementation. In a first example, in some embodiments, there are two or more host interfaces 111 to provide dual-porting. In a second example, in some embodiments, the data processing module 121 and/or the ECC module 161 are combined with the buffer 131. In a third example, in some embodiments, the host interfaces 111 are directly coupled to the buffer 131, and the data processing module 121 optionally and/or selectively operates on data stored in the buffer 131. In a fourth example, in some embodiments, the device interface logic 191 is directly coupled to the buffer 131, and the ECC module 161 optionally and/or selectively operates on data stored in the buffer 131.

The host interface 111 sends and receives commands and/or data via the external interface 110, and, in some embodiments, tracks progress of individual commands via a tag tracking module 113. For example, the commands include a read command specifying an address (such as an LBA) and an amount of data (such as a number of LBA quanta, e.g., sectors) to read; in response the SSD 101 provides read status and/or read data. For another example, the commands include a write command specifying an address (such as an LBA) and an amount of data (such as a number of LBA quanta, e.g., sectors) to write; in response the SSD 101 provides write status and/or requests write data and optionally subsequently provides write status. In some embodiments, the host interface 111 is compatible with a SATA protocol and, using NCQ commands, is enabled to have up to 32 pending commands, each with a unique tag represented as a number from 0 to 31. In some embodiments, the tag tracking module 113 is enabled to associate an external tag for a command received via the external interface 110 with an internal tag used to track the command during processing by the SSD controller 100.

According to various embodiments, one or more of: data processing module 121 optionally and/or selectively processes some or all data sent between the buffer 131 and the external interfaces 110; and data processing module 121 optionally and/or selectively processes data stored in the buffer 131. In some embodiments, the data processing module 121 uses one or more engines 123 to perform one or more of: encrypting; decrypting; compressing; decompressing; formatting; reformatting; transcoding; and/or any other data processing and/or manipulation task.

The buffer 131 stores data sent to/from the external interfaces 110 from/to the device interfaces 190. In some embodiments, the buffer 131 additionally stores system data, such as some or all map tables and/or journal entries, used by the SSD controller 100 to manage the non-volatile memory devices 192. In various embodiments, the buffer 131 has one or more of: a memory 137 used for temporary storage of data; a direct memory access (DMA) modules 133 used to control movement of data to and/or from the buffer 131; an ECC-X module 135 used to provide a higher-level error correction function; and other data movement and/or manipulation functions. An example of a higher-level error correction function is a RAID-like capability, where redundancy is at a non-volatile memory device (e.g., multiple ones of the non-volatile memory devices 192) level and/or a non-volatile memory die (e.g., non-volatile memory die 194) level instead of at a disk level.

According to various embodiments, one or more of: the ECC module 161 optionally and/or selectively processes some or all data sent between the buffer 131 and the device interfaces 190; and the ECC module 161 optionally and/or selectively processes data stored in the buffer 131. In some embodiments, the ECC module 161 implements one or more of: a cyclic redundancy check (CRC) code; a Hamming code; an Reed-Solomon (RS) code; a Bose Chaudhuri Hocquenghem (BCH) code; an low-density parity check (LDPC) code; a Viterbi code; a trellis code; a hard-decision code; a soft-decision code; an erasure-based code; any error detecting and/or correcting code; and any combination of the preceding.

The device interface logic 191 controls the non-volatile memory devices 192 via the device interfaces 190. The device interface logic 191 is enabled to send data to/from the non-volatile memory devices 192 according to a protocol of the non-volatile memory devices 192. The device interface logic 191 includes a scheduling module 193 to selectively sequence control of the non-volatile memory devices 192 via the device interfaces 190. For example, in some embodiments, the scheduling module 193 is enabled to queue operations to the non-volatile memory devices 192, and to selectively send the operations to individual ones of the non-volatile memory devices 192 (or the non-volatile memory die 194) as the individual non-volatile memory devices 192 (or the non-volatile memory die 194) are available.

The map 141 converts between data addressing used on the external interfaces 110 and data addressing used on the device interfaces 190, using table 143 to map external data addresses to locations in the non-volatile memory 199. For example, in some embodiments, the map 141 converts logical block addresses (LBAs) used on the external interfaces 110 to block and/or page addresses targeting one or more non-volatile memory die 194, via mapping provided by table 143. In some embodiments, a granularity of map 141 is fixed, such as mapping first fixed-sized logical blocks used on the external interfaces 110 to second fixed-sized blocks used on the device interfaces 190. In other embodiments, a granularity of map 141 is variable and not all blocks used on either the external interfaces 110 or the device interfaces 190 are necessarily a same size.

In some embodiments, table 143 associates logical page addresses with a respective map entry, where the logical page addresses are a portion of and/or are derived from the LBA, and the map entry identifies a portion of the non-volatile memory. For example, in some embodiments, the logical page address is a higher-order portion of the LBA, and a lower-order portion of the LBA is an offset within a logical page specified by the logical page address.

In some embodiments, the map entry identifies the portion of the non-volatile memory as a base address, such as a read unit address, and a length, such as a number of read units. In some embodiments, the read units are sequential in locations in an address space of the non-volatile memory. In further embodiments, the read units are striped across a plurality of non-volatile memory die (such as non-volatile memory die 194) and/or non-volatile memory devices (such as non-volatile memory devices 192).

In some embodiments, the map 141 uses a table 143 to perform and/or to look up translations between addresses used on the external interfaces 110 and data addressing used on the device interfaces 190. According to various embodiments, the table 143 is one or more of: a two-level map; a multi-level map; a map cache; a compressed map; any type of mapping from one address space to another; and any combination of the foregoing.

In some embodiments, the map 141 also stores a volatile (not yet saved to NVM) portion of a journal 145, and is further enabled to use some or all of the journal 145 to update the table 143 at power-on. In various embodiments, when the table 143 is updated, such as due to a write operation to a particular logical block address updating an entry in the table 143 corresponding to the particular logical block address with a new physical address in NVM corresponding to a location of data of the write operation, an entry comprising the particular logical block address and the new physical address is added to the journal 145. When the journal 145 reaches a determined size, or based on other events such as receiving a standby-immediate command, at least a portion of the journal 145 is saved to NVM. After the at least a portion of the journal 145 is saved to NVM, the at least a portion of the journal 145 is available to accumulate further entries. The term "determined" is generally used to indicate that an associated value and/or parameter is set by a user (e.g., using an input or through configuration information) or dynamically based on one or more operational criteria and/or measurements.

According to various embodiments, the table 143 and/or the journal 145 include one or more of: static random access memory (SRAM); dynamic random access memory (DRAM); non-volatile memory (such as flash memory); cache memory; on-chip memory; off-chip memory; and any combination of the foregoing. In some embodiments, the buffer 131 contains some or all of the table 143 and/or the journal 145. For example, buffer 131 contains a cache of a portion of the table 143, and/or a recently-written portion of the journal 145.

In some embodiments, the recycler module 151 performs garbage collection. For example, in some embodiments, non-volatile memory devices 192 contain blocks that need to be erased before the blocks are re-writeable. The recycler module 151 is enabled to determine which portions of the non-volatile memory devices 192 are actively in use, such as by scanning a map maintained by map 141, and to make unused portions of non-volatile memory devices 192 available for writing by erasing them. In further embodiments, the recycler module 151 is enabled to move data stored within the non-volatile memory devices 192 to make larger contiguous portions of the non-volatile memory devices 192 available for writing.

The CPU 171 controls various portions of SSD controller 100. The CPU 171 includes a CPU core 172. The CPU core 172 is, according to various embodiments, one or more single-core or multi-core processors. The individual processor cores in the CPU core 172 are, in some embodiments, multi-threaded. The CPU core 172 includes instruction and/or data caches and/or memories. For example, the instruction memory contains instructions to enable the CPU core 172 to execute software (sometimes called firmware) to control the SSD controller 100. In some embodiments, some or all of the firmware executed by the CPU core 172 is stored on the non-volatile memory devices 192.

In various embodiments, the CPU 171 further includes: a command management module 173 to track and control commands received via the external interfaces 110 while the commands are in progress; a buffer management module 175 to control allocation and use of the buffer 131; a translation management module 177 to control the map 141, such as managing the table 143 and/or the journal 145; a coherency management module 179 to control consistency of data addressing and to avoid conflicts such as between external data accesses and recycle data accesses; a device management module 181 to control device interface logic 191; and optionally other management units. In one example, the device management module 181 may be configured to implement a flash translation layer (FTL) in accordance with embodiments of the invention. None, any, or all of the management functions performed by the CPU 171 are, according to various embodiments, controlled and/or managed by hardware, by firmware, by software (such as software executing on the CPU core 172 or on a host connected via the external interfaces 110), or any combination thereof. The device management module 181 may be implemented as part of the CPU 171, or could be implemented in hardware, or could be implemented by a combination of firmware running on the CPU 171 and hardware.

In some embodiments, the CPU 171 is enabled to perform other management tasks, such as one or more of: gathering and/or reporting performance statistics; implementing self-monitoring analysis and reporting technology (SMART); controlling power sequencing, controlling and/or monitoring and/or adjusting power consumption; responding to power failures; controlling and/or monitoring and/or adjusting clock rates; and other management tasks.

Various embodiments include a computing-host non-volatile memory controller that is similar to the SSD controller 100 and is compatible with operation with various computing hosts, such as via adaptation of the host interface 111 and/or the external interface 110. The various computing hosts include one or any combination of a computer, a workstation computer, a server computer, a storage server, a personal computer (PC), a laptop computer, a notebook computer, a netbook computer, a personal digital assistant (PDA), a media player, a media recorder, a digital camera, a cellular handset, a cordless telephone handset, and an electronic game.

In various embodiments, all or any portion of an SSD controller 100 (or a computing-host non-volatile memory controller) are implemented on a single integrated circuit (IC), a single die of a multi-die IC, a plurality of dice of a multi-die IC, or a plurality of ICs. For example, the buffer 131 is implemented on a same die as other elements of the SSD controller 100. For another example, the buffer 131 is implemented on a different die than other elements of SSD controller 100.

Figure 2:
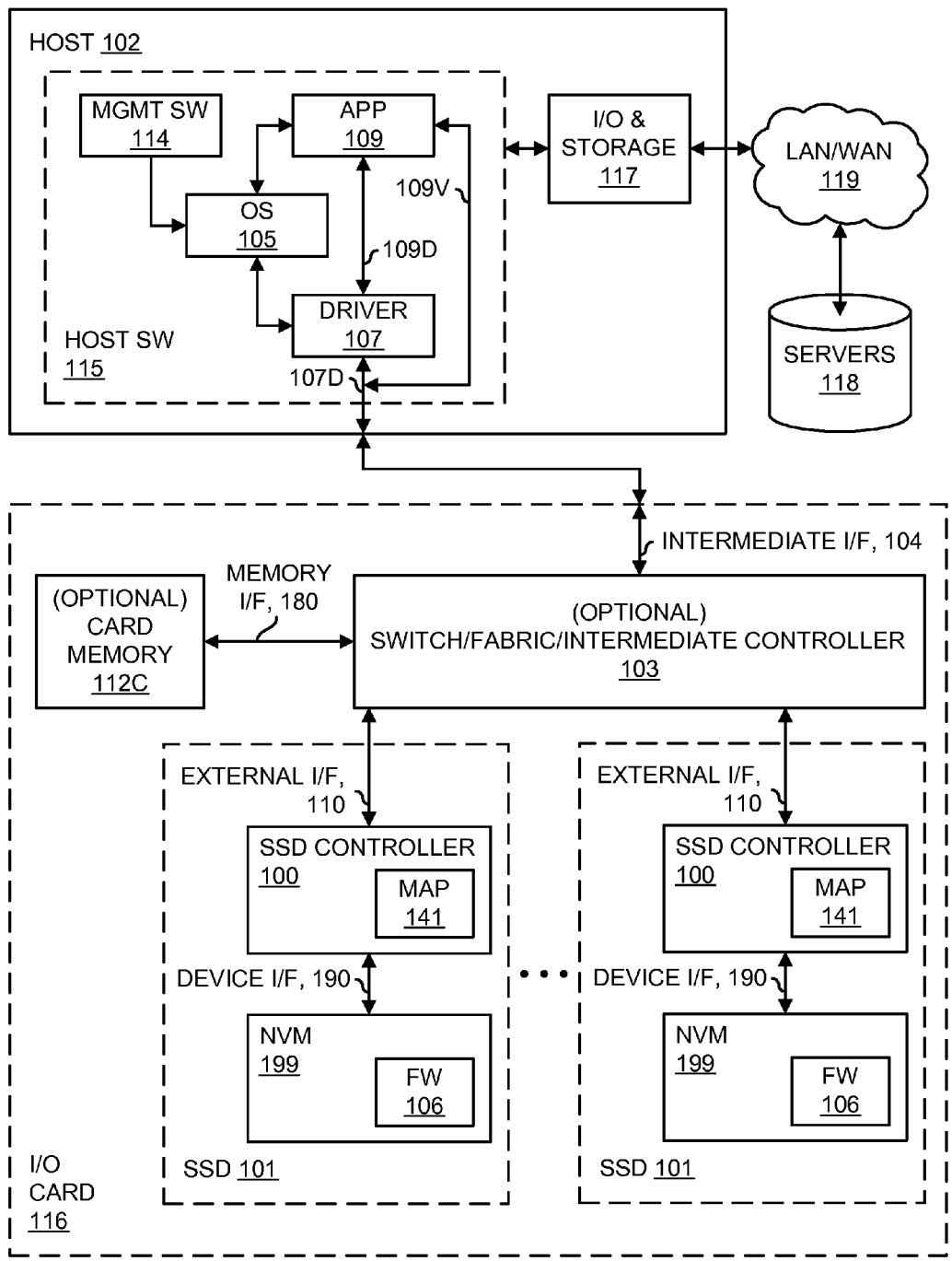
FIG. 2 is a diagram illustrating various embodiments of systems including one or more instances of the SSD of FIG. 1.

Referring to FIG. 2, a diagram is shown illustrating various embodiments of systems including one or more instances of the SSD 101 of FIG. 1. The SSD 101 includes the SSD controller 100 coupled to the NVM 199 via the device interfaces 190. FIG. 2 generally illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of one or more SSDs coupled indirectly to a host via various interconnection elements, each of one or more instances of the SSD 101 is respectively coupled indirectly to the host 102. Each indirect coupling is via a respective instance of the external interfaces 110 coupled to a Switch/Fabric/Intermediate Controller 103, and an intermediate interface 104 coupling the Switch/Fabric/Intermediate Controller 103 to the host 102. As an example embodiment of a single SSD coupled directly to a host, one instance of the SSD 101 is coupled directly to the host 102 via the respective external interface 110 (e.g., the Switch/Fabric/Intermediate Controller 103 is omitted, bypassed, or passed-through). As an example embodiment of a plurality of SSDs each coupled directly to a host via respective external interfaces, each of a plurality of instances of the SSD 101 is respectively coupled directly to the host 102 via a respective instance of the external interface 110 (e.g., the Switch/Fabric/Intermediate Controller 103 is omitted, bypassed, or passed-through).

Some of the embodiments including the Switch/Fabric/Intermediate Controller 103 also include a card memory 112C coupled via a memory interface 180 and accessible by the SSDs 101. In various embodiments, one or more of the SSDs 101, the Switch/Fabric/Intermediate Controller 103, and/or the card memory 112D are included on a physically identifiable module, card, or pluggable element (e.g., an I/O card 116). In some embodiments, the SSD 101 (or variations thereof) corresponds to a SAS (serial attached small computer system interface, or serial SCSI) drive or a SATA (serial advanced technology attachments, or serial ATA) drive that is coupled to an initiator operating as the host 102.

The host 102 is enabled to execute various elements of host software (HOST SW) 115, such as various combinations of operating system (OS) 105, driver software 107, application software 109, and multi-device management software 114. Line 107D is representative of host software—I/O device communication (e.g., data sent/received to/from one or more of the instances of the SSD 101 and from/to any one or more of OS 105 via driver 107, driver 107, and application 109, either via driver 107, or directly as a virtual function (VF).

In various embodiments, the OS 105 includes and/or is enabled to operate with drivers (illustrated conceptually by driver 107) for interfacing with the SSD 101. Various versions of Windows (e.g., 95, 98, ME, NT, XP, 2000, Server, Vista, 7, 8, etc.), various versions of Linux (e.g., Red Hat, Debian, Ubuntu, etc.), and various versions of MacOS (e.g., 8, 9, X, etc.) are examples of operating systems that may be used to implement the OS 105. In various embodiments, the drivers 107 are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to the SSD 101. Some drives and/or drivers have pass-through modes to enable application-level programs, such as application 109 via Optimized NAND Access (sometimes termed ONA) or Direct NAND Access (sometimes termed DNA) techniques, to communicate commands directly to the SSD 101, enabling a customized application to use commands specific to the SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of nonstandard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver 107 are a driver without ONA or DNA support, an ONA-enabled driver, a DNA-enabled driver, and an ONA/DNA-enabled driver. Further examples of the driver 107 are a vendor-provided, vendor-developed, and/or vendor-enhanced driver, and a client-provided, client-developed, and/or client-enhanced driver.

Examples of the application-level programs 109 are an application without ONA or DNA support, an ONA-enabled application, a DNA-enabled application, and an ONA/DNA-enabled application. A line 109D is representative of Application—I/O Device communication (e.g., bypass via a driver or bypass via a virtual function for an application), e.g., an ONA-enabled application and an ONA-enabled driver communicating with an SSD, such as without the application using the OS 105 as an intermediary. A line 109V is representative of Application—I/O Device communication (e.g., bypass via a virtual function for an application), e.g., a DNA-enabled application and a DNA-enabled driver communicating with an SSD, such as without the application using the OS 105 or the driver 107 as intermediaries.

One or more portions of the NVM 199 are used, in some embodiments, for firmware (FW) storage (e.g., FW 106). The firmware storage includes one or more firmware images (or portions thereof). A firmware image has, for example, one or more images of firmware, executed, for example, by the CPU core 172 of the SSD controller 100. A firmware image has, for another example, one or more images of constants, parameter values, and NVM device information, referenced, for example, by the CPU core 172 during the firmware execution. The images of firmware correspond, for example, to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g., one or more application program interfaces (APIs) are "unlocked") via keys or various software techniques, optionally communicated and/or provided by a driver.

In some embodiments where the Switch/Fabric/Intermediate Controller 103 is omitted, the SSD 101 is coupled to the host 102 directly via the respective external interface 110. In various embodiments, the SSD controller 100 is coupled to the host 102 via one or more intermediate levels of other controllers, such as a RAID controller. In some embodiments, the SSD 101 (or variations thereof) corresponds to a SAS drive or a SATA drive and the Switch/Fabric/Intermediate Controller 103 corresponds to an expander that is in turn coupled to an initiator, or alternatively the Switch/Fabric/Intermediate Controller 103 corresponds to a bridge that is indirectly coupled to an initiator via an expander. In some embodiments, the Switch/Fabric/Intermediate Controller 103 includes one or more peripheral component interconnect express (PCIe) switches and/or fabrics.

In various embodiments, such as some of the embodiments where the host 102 is a computing host (e.g., a computer, a workstation computer, a server computer, a storage server, a PC, a laptop computer, a notebook computer, a netbook computer, etc.), the computing host is optionally enabled to communicate (e.g., via optional I/O & storage devices/resources 117 and an optional LAN/WAN 119) with one or more local and/or remote servers (e.g., optional servers 118). The communication enables, for example, local and/or remote access, management, and/or usage of any one or more of the SSD 101 elements. In some embodiments, the communication is wholly or partially via Ethernet. In some embodiments, the communication is wholly or partially via Fibre Channel. The LAN/WAN 119 is representative, in various embodiments, of one or more local and/or wide area networks, such as any one or more of a network in a server farm, a network coupling server farms, a metro-area network, and the Internet.

In various embodiments, an SSD controller and/or a computing-host non-volatile memory controller in combination with one or more NVMs are implemented as a non-volatile storage component, such as a universal serial bus (USB) storage component, a CF (compact flash) storage component, an MMC (MultiMediaCard) storage component, an SD (secure digital) storage component, a Memory Stick storage component, and an xD-picture card storage component.

In various embodiments, all or any portions of an SSD controller (or a computing-host non-volatile memory controller), or functions thereof, are implemented in a host that the controller is to be coupled with (e.g., host 102 of FIG. 2). In various embodiments, all or any portions of an SSD controller (or a computing-host non-volatile memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1) is implemented partially via software on a host and partially via a combination of firmware and hardware in an SSD controller. For another example, functionality of or associated with a recycler unit (such as similar to Recycler 151 of FIG. 1) is implemented partially via software on a host and partially via hardware in a computing-host non-volatile memory controller.

In various embodiments, a flash translation layer (FTL) uses both a journal and a multi-level map, such as a two-level map. The FTL combines a journaling technique to defer saving the two-level map FTL state non-volatility by aggregating a plurality of updates to second-level map (SLM) pages before the SLM pages are saved non-volatility. The aggregation of the plurality of updates enabled by the journaling technique advantageously reduces a cost of saving the FTL non-volatility. By using the journal to record translations between logical block addresses (LBAs) and physical locations in non-volatile memory (NVM) of the I/O device, saving of second-level map pages can be deferred. In turn, by deferring second-level map page saving, at least some of the second-level map pages are enabled to aggregate a plurality of updates, amortizing a cost in map write amplification of saving the second-level map pages. A duration of delaying the second-level map page saving is according to a length in entries of the journal, advantageously enabling trade-offs in recovery time vs. map write amplification.

In some embodiments, user data written to the I/O device is saved in a first type of NVM, and the journal and/or the map are saved in a second type of NVM. In further embodiments, the first type of NVM and the second type of NVM optionally and/or selectively are present in a single NVM device, such as by storing the user data in cells of the NVM managed as MLC (Multi-Level Cell), and storing the journal and/or the map in cells of the NVM managed as SLC (Single-Level Cell). In other embodiments, the journal and/or the map are saved non-volatility in a different type of NVM from the user data, such as saving the journal and/or the map in MRAM or PCM, and saving the user data in NAND flash.

In some embodiments and/or usage scenarios, journaling, self-journaling, and/or hierarchical consistency are conceptually related to the units in which the NVM is managed (e.g. R-blocks), how NVM management units are written (e.g. bands), and how the writing of the management units is managed (e.g. as streams). As specific examples, an R-block generally represents a collection of NVM blocks (e.g. one block from each NVM die in an SSD, NVM locations within the blocks being written in a striped fashion). A band generally represents a collection of R-blocks that information is serially written into (e.g. in a specific time order), and is optionally populated with information having similar properties and/or characteristics. A stream generally represents a band managed such that, within the band, information is written to NVM in a same order that the information is presented for writing into NVM (e.g. information presented at an earlier time is written before information presented at a later time). Conceptually, information that is written to a band that is managed as a stream is streamed into the NVM in a FIFO-like fashion, organized in time order.

According to various embodiments, the journal is saved to one or more of: a same band and/or region of the NVM as the user data; a same band and/or region of the NVM as the map; in portions corresponding to a region of the NVM, such as an R-page, and with the corresponding portion; with a pointer to a previous and/or next portion of the journal; with a directory indicating one or more portions of the journal; and other techniques.

In various embodiments, data written to the Nvm is self-journaling. Self-journaling enables recovery of information consistent with a particular object using only information available in the particular object. For example, host data is stored in an NVM along with information identifying to which LEAs the host data corresponds. For another example, recycled data is stored in the NVM along with information identifying to which LBAs the recycled data corresponds. For example, a header is written with each portion of data identifying the data, such as by including an LBA associated with the data. In this manner, the data writes themselves comprise a journal. The self-journaling is adequate for recovery, but because the self-journaling is physically located with the corresponding data, reading the self-journaling information takes much longer than reading the more compact journal entries. The self-journaling is used only for recovery of a tail (most recent) portion of the journal that was not saved to NVM.

In some embodiments, the FTL uses a two-level map comprising a first-level map and a second-level map. The first-level map comprises a plurality of first-level map entries, each of the first-level map entries associated with a respective one of a plurality of second-level map pages of the second-level map. Each of the second-level map pages comprises a plurality of respective second-level map entries, each of the second-level map entries associating a logical block address in a logical block address space with a physical location in a non-volatile memory of the I/O device. For example, in some embodiments and/or usage scenarios, the first-level map is stored in memory of the SSD controller (such as on-chip SRAM or off-chip DRAM), each of the first-level map entries comprises a respective physical address in NVM of the associated second-level map page, and each of the second-level map entries comprises a respective physical address in NVM of the user data corresponding to the associated logical block address. Continuing the example, further embodiments and/or usage scenarios cache and/or shadow at least a portion of the second-level map in SRAM and/or DRAM of the SSD controller for faster access to at least a portion of the second-level map.

In various embodiments, the logical block addresses are mapped in units of a granularity of a specified number of sequential logical block addresses. For example, in some embodiments and/or usage scenarios, the logical block addresses correspond to 512B SATA sectors, and the mapping is on a granularity of eight sequential sectors—a 4 KB mapping unit. A logical page number is used to refer to a portion of the logical block address space corresponding to the mapping unit. In this example, the logical page number would be the MSBs of the logical block address, omitting the three LSBs (which specify a SATA sector within a logical page).

According to various embodiments, each of the second-level map entries comprises one or more of: (i) a respective physical location in NVM, such as a page address, a sub-page address (such as a sector address or a read unit address), or a byte address, (ii) a respective length indication, such as a length in a granularity greater than bytes, (iii) a respective span indication, such as a span (or length) in a number of read units and (iv) respective status information, such as trimmed or uncorrectable information.

Figure 3:
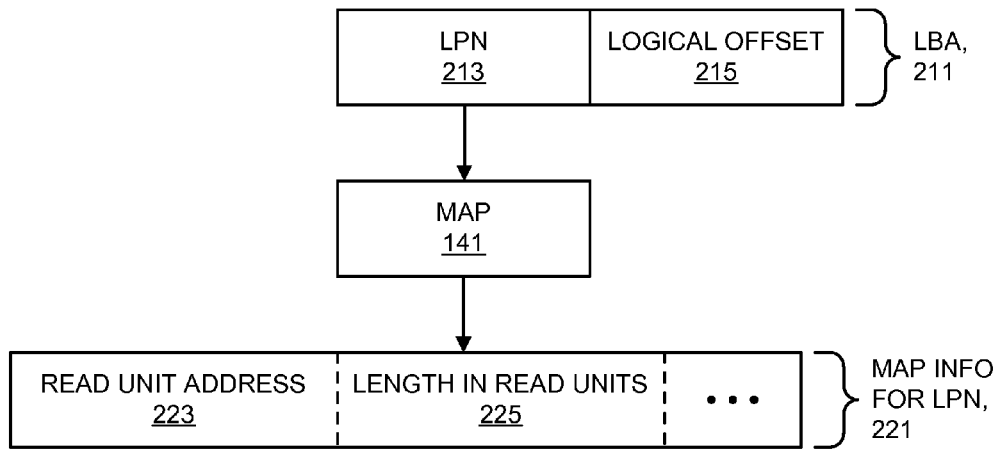
FIG. 3 is a diagram illustrating selected details of an embodiment of mapping a logical page number (LPN) portion of a logical block address (LBA)

Referring to FIG. 3, a diagram is shown illustrating selected details of an embodiment of mapping a logical page number (LPN) 213 portion of a logical block address (LBA) 211 to a second-level map entry. In some embodiments, a read unit is a finest granularity of an NVM that is independently readable, such as a portion of a page of the NVM. In further embodiments, the read unit corresponds to check bits (sometimes-termed redundancy) of a (lower-level) error correcting code along with all data protected by the check bits. For example, in some embodiments, the ECC 161 of FIG. 1 implements error correction using check bits, such as via low-density parity-check (LDPC) code, and a read unit corresponds to coding bits implementing the LDPC code in addition to data bits protected by the LDPC coding bits.

In some embodiments, the map 141 maps the LPN 213 portion of the LBA 211 to a second-level map entry (e.g., LPN map information 221), such as via table 143 (as illustrated in FIG. 1). The map 141 is said to associate an LPN with a corresponding second-level map entry. In various embodiments, mapping is via one or more associative look-ups, via one or more non-associative look-ups, and/or via one or more other techniques. In some embodiments, SSD Controller 100 maintains one second level map entry for each LPN potentially and/or actively in use.

In some embodiments, the LPN map information 221 includes a first field containing a respective read unit address 223 and a second field containing a respective length in read units 225. In some embodiments, a length and/or a span are stored encoded, such as by storing the length as an offset from the span (e.g., in all or any portions of the length in read units 225). In further embodiments, a first LPN is associated with a first second-level map entry, a second LPN (different from the first LPN, but referring to a logical page of a same size as a logical page referred to by the first LPN) is associated with a second second-level map entry, and the respective length in read units of the first map entry is different from the respective length in read units of the second map entry.

In various embodiments, at a same point in time, a first LPN is associated with a first second-level map entry, a second LPN (different from the first LPN) is associated with a second second-level map entry, and the respective read unit address of the first map entry is the same as the respective read unit address of the second map entry. In further embodiments, data associated with the first LPN and data associated with the second LPN are both stored in a same physical page of a same device in NVM 199.

According to various embodiments, the read unit address 223 is associated with one or more of: a starting address in the NVM; an ending address in the NVM; an offset of any of the preceding; and any other techniques for identifying a portion of the NVM associated with the LPN 213.

A "read unit" is the smallest quantity of correctable data readable from the NVM of the I/O device. For example, a read unit comprises the user data bytes and ECC check bytes of one error correction codeword stored in the NVM. (In various embodiments, the read unit further comprises headers containing meta-data and/or other information.) Typical sizes for the user data bytes of a read unit include 512B, 1 KB, 2 KB, and other sizes. Typical sizes for the ECC bytes of one read unit vary depending on a type of NVM used and a number of read units in each NVM page and the user data size of each of the read units. In some embodiments, the size of the user data in a read unit is not a power of two.

Generally, there would be a plurality of read units per NVM page. For example, an NVM page is 16 KB of user data plus "spare" bytes used for error correction, and each read unit comprises 2 KB for user data (e.g., one-eighth of the user portion of the NVM page) plus a portion of the "spare" bytes for error correction of that portion. The layout of read units in an NVM page does not have to separate the user bytes and ECC check bytes of one read unit, such as by assigning the ECC check bytes in the spare area. For example, in some embodiments, the entire NVM page including the spare bytes is divided into n adjacent pieces to form n read units. In further embodiments, a portion of the NVM page might be unused, such as when a total number of bytes in the NVM page is not divisible by n or by 2n.

In some embodiments, the respective physical location stored in the map information is associated with one or more read units in the NVM, the one or more read units containing data associated with the respective logical block address. The respective span indication in the map information is the number of the one or more read units, and the respective length indication is a length in a fixed-sized unit, such as 32B or 64B quanta, of the data associated with the respective logical block address as stored in the one or more read units.

According to various embodiments and/or usage scenarios, one or more of: a number of bits needed to store one of the respective physical locations is according to a physical capacity of the I/O device; and a granularity of the respective physical locations is according to a size of a read unit of the NVM. Typically, the map information for a 256 GB capacity SSD uses from to 36 bits, depending on the granularity of the respective length indication, the type of NVM (such as whether extended blocks are used), and other factors.

Figure 4:
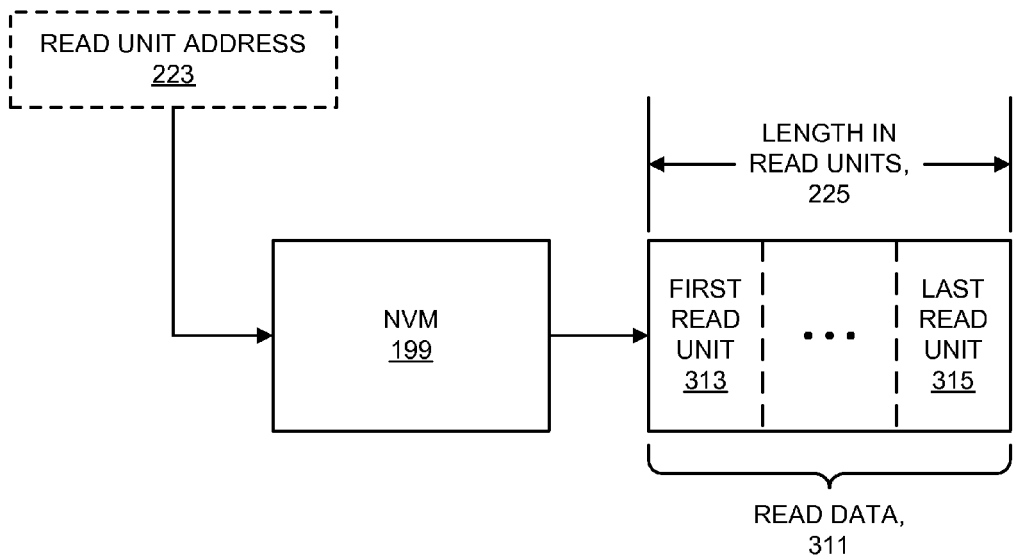
FIG. 4 is a diagram illustrating selected details of an embodiment of accessing a non-volatile memory (NVM) at a read unit address to produce read data organized as various read units, collectively having a length measured in quants of read units.

Referring to FIG. 4, a diagram is shown illustrating selected details of an embodiment of accessing a non-volatile memory (NVM) at a read unit address 223 to produce read data 311 organized as various read units 313, . . . , 315, collectively having a length measured in quanta of read units. According to various embodiments, a first read unit 313 is one or more of: one of the read units in read data 311 with a lowest address in an address space of the NVM; a fixed one of the read units; an arbitrary one of the read units; a variable one of the read units; and one of the read units selected by any other technique. In various embodiments, the SSD controller 100 is enabled to access NVM 199 and produce read data 311 by reading no more than a number of read units specified by the length in the read units field 225 of the second-level map entry 221.

In various embodiments and/or usage scenarios, a read unit (such as the read units 313 or 315 in FIG. 4) includes a number of headers (and optionally a header marker field) such as the headers described in U.S. Provisional Application No. 61/781,744, filed Mar. 14, 2013, and which is hereby incorporated by reference in its entirety. According to various embodiments, a header includes and/or is associated with and/or is optionally and/or selectively appended or prepended with an epoch field. The epoch field is a time marker that identifies a write order of an object the header is part of in relation to other objects of a similar or different stream.

Figure 5:
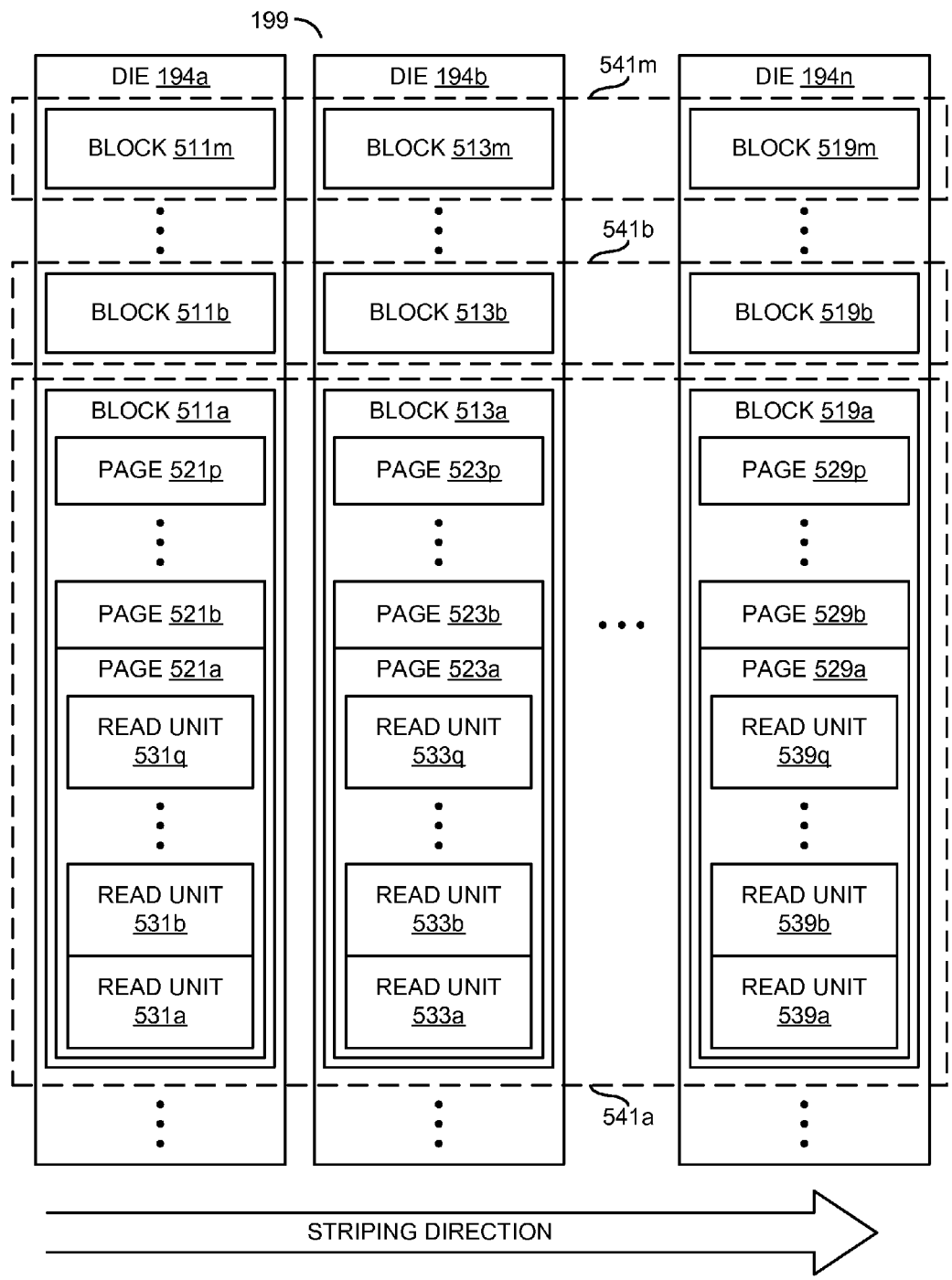
FIG. 5 is a diagram illustrating selected details of an embodiment of blocks, pages, and read units of multiple NVM devices.

Referring to FIG. 5, a diagram is shown illustrating selected details of an embodiment of blocks, pages, and read units of multiple NVM devices. In one example, the NVM media 199 may comprise multiple non-volatile memory devices embodying a number of blocks, pages, and read units (or e-pages). For example, devices 194b-194n correspond to respective ones of one or more individual non-volatile memory die. In some embodiments, NVM devices 194a-194n are a portion of the NVM media 199. For example, in various embodiments, data is striped independently across multiple groups of devices, where each of the groups of devices is independently accessible.

Each NVM device (e.g., any one of the devices 194a, 194b, . . . , and 194n) provides storage organized as a plurality of NVM blocks (e.g., blocks 511a, 511b, . . . , and 511m of device 194a; blocks 513a, 513b, . . . , and 513m of device 194b; and so forth). The NVM blocks in turn include a plurality of NVM pages (e.g., pages 521a, 521b, . . . , and 521p of block 511a; pages 523a, 523b, . . . , and 523p of block 513a; and so forth). The NVM pages in turn comprise a plurality of read units (e.g., read units 531a, 531b, . . . , and 531q of page 521a; read units 533a, 533b, . . . , and 533q of page 523a; and so forth). Reads and/or writes of information in the devices are performed according to an order, such as a 'read unit first' order or a 'page first' order. An example of a read unit first order for read units illustrated in FIG. 2 begins with read unit 531a followed by units 533a, . . . , 539a, 531b, 533b, 539b, and so forth, ending with unit 539q. An example of a page first order for read units illustrated in FIG. 2 begins with read unit 531a followed by units 531b, . . . , 531q, 533a, 533b, . . . , 533q, 539a, 539b, and so forth, ending with unit 539q.

In various embodiments, the NVM blocks of the NVM media 103 are organized as a plurality of R-blocks (e.g., R-blocks 541a, 541b, . . . , 541m). The R-blocks are used as a unit of allocation. The R-blocks comprise n blocks from each die (n being most typically 1 or 2 with, for example, current flash devices). In a first example, there are b R-blocks (0 to b−1), and R-block k comprises the k'th block from each die. In a second example, there are b/2 R-blocks, and R-block k comprises the k'th block and the k+b/2'th block from each die. However, other arrangements of blocks into R-blocks may be implemented to meet the design criteria of a particular implementation.

The non-volatile memory die 194a-194n comprise a number of planes (e.g., one, two, four etc.). Each plane comprises a number (e.g., 512, 1024, 2048, etc.) of NVM blocks. Each of the NVM blocks comprises a number of pages, such as 128, 256, or 512 pages. A page is generally the minimum-sized unit that can be independently written, and a block is generally the minimum-sized unit that can be independently erased. In various embodiments, each page of the non-volatile memory devices 194a-194n comprises a plurality of read units, which may also be referred to as ECC-pages or simply e-pages. Each e-page is an amount of user data and the corresponding ECC data that, together, comprise one ECC codeword (e.g., a correctable unit). Typically, there are an integer number of e-pages per NVM page, or in some embodiments, per multi-plane page. The e-pages are the basic unit that can be read and corrected, hence e-pages are also called "read units." Typically, read units may have 1 KB or 2 KB of user data, and an even share of the remaining bytes in the non-volatile memory page (so that all read units in a same one of the multi-plane pages are the same total size). An e-page (or read unit) is thus the minimum-sized unit that can be independently read (and ECC corrected).

Some non-volatile memory die, such as flash die, generally enable multi-plane operations—operating on one or more of the planes in parallel—which improves bandwidths. For this reason, the term NVM block as used herein generally refers to a multi-plane block, such as one block from each of the planes, and the term page as used herein generally refers to a multi-plane page, such as one page from each of the planes. In various embodiments, R-blocks may comprise one or more multi-plane blocks from each die. The R-blocks in turn comprise a plurality of R-pages. An R-page comprises 1 (multi-plane) page from each of the (multi-plane) blocks in the R-block. In some embodiments, there are p R-pages (0 to p−1) and R-page j comprises the j'th page from each of the blocks in the R-block.

The term host page is used to distinguish that the mapping between logical blocks (e.g., SATA sectors) used by the host and physical locations in the non-volatile memory is on a granularity that is optionally larger than that of the logical blocks. For example, in some usage scenarios, eight consecutive logical blocks are treated as one host page (e.g., eight, consecutive 512B SATA sectors are treated as a 4 KB unit) for purposes of mapping logical block addresses to physical locations in the non-volatile memory.

Figure 6:
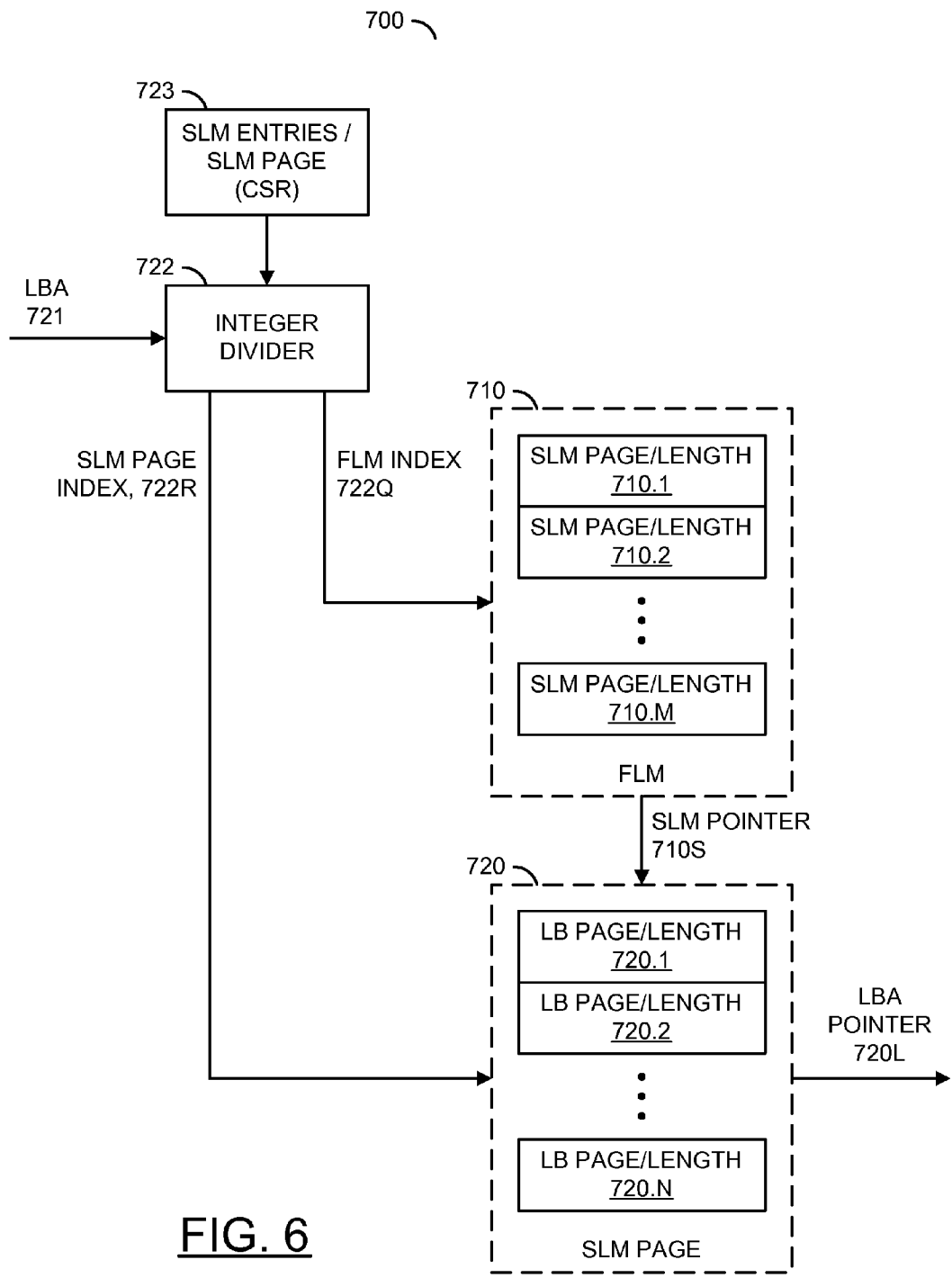
FIG. 6 is a diagram illustrating selected details of an embodiment of mapping LBAs to logical blocks (LBs) stored in an NVM via a two-level map having a first-level map (FLM) and one or more second-level map (SLM) pages.

Referring to FIG. 6, a diagram is shown illustrating selected details of an embodiment of mapping LBAs to logical blocks (LBs) stored in an NVM via a two-level map having a first-level map (FLM) and one or more second-level map (SLM) pages. The two-level map is implemented via a first-level map element (FLM 710) coupled to one or more second-level map elements (illustrated conceptually as a single element SLM Page 720). The FLM includes a plurality of entries (e.g., SLM Page/Length 710.1, . . . , SLM Page/Length 710.M). Each of the entries of the FLM points to one of the SLM pages (such as SLM page 720). The SLM page 720 includes a plurality of entries (e.g., LB Page/Length 720.1, . . . , LB Page/Length 720.N). Each of the entries of the SLM pages points to a location in the NVM 199 where data begins (e.g., a read unit storing at least the beginning of host write data for an LBA). A divider (e.g., integer divider 722) receives a parameter, from, for example, a programmable hardware register (e.g., SLM Entries/SLM Page (CSR) 723), by which to divide an incoming LBA, to determine which FLM entry to select and which SLM entry (within the SLM page pointed to by the selected FLM entry) to select. In some embodiments, the divider is coupled to the FLM and the SLM pages. In other embodiments, some or all of the process of mapping LBAs, such as the divider, is implemented (e.g., in firmware or software) on a processor such as the CPU 171.

In various embodiments, FIG. 6 is illustrative of selected details of or related to the map 141 and/or the table 143 of FIG. 1. For example, in some embodiments, the map 141 and/or the table 143 implement one or more caches of mapping information, such as one or more entries of an FLM and/or one or more pages and/or entries of an SLM. An entire image of the FLM and/or the SLM is maintained in a portion of NVM (e.g., NVM 199 of FIG. 1), updated, for example, when the caches replace a previously cached FLM and/or SLM page. In some embodiments, the FLM and/or the SLM entire images are implemented via rolling or ping-pong checkpoints, each of the checkpoints being at least a portion of the respective entire map image.

In operation, LBA 721 is presented to integer divider 722. The divider divides the LBA by a number of SLM entries per SLM page, as provided by SLM Entries/SLM Page (CSR) 723, resulting in a quotient (FLM Index 722Q) and a remainder (SLM Page Index 722R). The quotient is used to select one of the FLM entries, and a page field of the selected FLM entry is read (SLM Pointer 710S). The page field is used to select one of the SLM pages (e.g., SLM page 720), and the remainder is used (e.g., as an offset) to select an entry of the selected SLM page. A page field of the selected SLM page entry is used to select a particular location in the NVM, such as a particular read unit, where at least the beginning of the LB corresponding to the presented LBA is stored (LB Pointer 720L). In various embodiments, the LB pointer includes an address of a read unit of the NVM (e.g., read unit address 223 of FIG. 2). In some embodiments, each of the SLM entries includes a length field (e.g., encoding size and/or span) indicating how many read units to read to obtain all of the data for an LB and/or where within a read unit data for an LB begins (e.g., Length in Read Units 225 of FIG. 3). In some embodiments, each of the FLM entries includes a length field (e.g., encoding size and/or span) indicating how many read units to read to obtain all of the respective SLM page specified by the page field of the FLM entry (e.g., Length in Read Units 225 of FIG. 3).

In various embodiments, the quotient is used as a key to access a cache, such as a fully associative cache of SLM pages. If there is a hit in the cache for a particular SLM page, then a latest copy of the particular SLM page is found in the cache without accessing the NVM. Providing fast access to a plurality of SLM pages enables, in some embodiments and/or usage scenarios, more efficient processing of a plurality of independent streams of sequential data accesses to NVM (e.g., a first stream of sequential data accesses to a first region of LBAs interspersed with a second stream of sequential data accesses to a second region of LBAs.

In some embodiments, a logical block address (or a logical page number portion thereof) is divided (by an integer divider) using a specified divisor into a quotient and a remainder. The specified divisor is according to a number of second-level map entries per second-level map page, the quotient is an index in the first-level map of a particular first-level map entry associated with the logical page address, the particular first-level map entry specifies a physical location of a corresponding second-level map page, the remainder is an index in the corresponding second-level map page of a particular second-level map entry, and the particular second-level map entry specifies a physical location and/or other information of data associated with the logical block address. In further embodiments in which at least a portion of the second-level map pages are cached and/or shadowed in SRAM and/or DRAM of the SSD controller, the first-level map index is used, at least in part, to locate the cached and/or shadowed copy, if any, of the corresponding second-level map page, such as via a direct array access or via a hash table.

Figure 7:
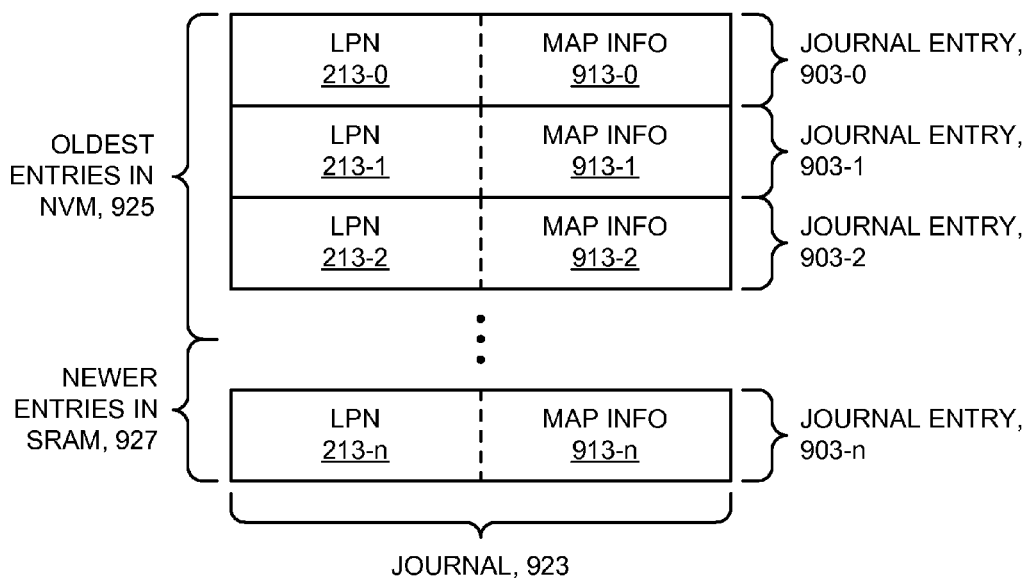
FIG. 7 is a diagram illustrating selected details of an embodiment of mapping LPNs to map information via one or more journal entries.

Referring to FIG. 7, a diagram is shown illustrating selected details of an embodiment of a mapping of LPNs to map information via one or more journal entries. The journal 923 comprises a plurality of journal entries 903-0, . . . , 903-n. Each of the journal entries 903-0, . . . , 903-n comprises a respective logical block address 213-0, . . . , 213-n and respective map information (e.g., MAP INFO 913-0, . . . , 913-n). The respective map information comprises a respective physical location in the NVM 199. In some embodiments, the respective map information is of a same form as and/or comprises map information as would be stored in one of the second-level map entries. In various embodiments, the journal entries optionally and/or selectively store other information, such as respective valid bits, respective indications of a corresponding band, respective indications of status associated with the logical block address such as trimmed status, etc. In some embodiments, the journal entries comprise a respective logical page number portion of a logical block address rather than the full respective logical block address. For example, the LSBs of the logical block address are not stored, as the map operates on logical pages rather than on host sectors.

In some embodiments, journal entries are compressed or otherwise reduced in size. For example, since the physical location portion of the map information of journal entries is generally monotonic in nature, the physical locations are, in some embodiments, stored in a decreased amount of space by periodically storing a base physical location and only including an offset from the base physical location in the map information of one or more subsequent journal entries. Similar techniques are applicable to reducing a size needed to store the logical page number portion of journal entries.

For example, a 256 GB (256*10^9 bytes) SSD using a sector-based (512B) logical block address space performs mapping on 4 KB units, and uses 26-bit logical page numbers. The same SSD has 256 GB (256*2^30 bytes) of physical NVM and uses 2 KB read units, thus requiring 27 bits of physical (read unit) location, plus additional length and/or span information.

In various embodiments, the journal is treated as a FIFO of a maximum journal size, such as 1M entries or 3M entries or more. Journal entries are added to a trailing (or tail) portion of the journal that is stored in volatile memory, such as SRAM or DRAM of the SSD controller, and when the portion of the journal stored in the volatile memory is of a sufficient size, that portion is saved to NVM. For example, newer journal entries 927 are accumulated in on-chip SRAM (or off-chip DRAM) until a number of entries that would fill a NVM page is accumulated. Then, the accumulated entries are written to a journal area of the NVM (e.g., older entries 925). In further embodiments, accumulation of additional journal entries is not delayed (or is not significantly delayed) by the writing of the accumulated entries to the NVM.

According to various embodiments and/or usage scenarios, one or more of: a number of bits needed to store one of the respective logical page numbers is according to a logical capacity of the I/O device; and a granularity of the respective logical page numbers is according to a number of sequential ones of the logical block addresses that are mapped as a unit.

Typically, a journal entry for a 256 GB capacity SSD uses from 56 to 62 bits, depending on the granularity of the respective length indication, the type of NVM (such as whether extended blocks are used), and other factors.

In some embodiments, when the portion of the journal stored in the volatile memory is of a sufficient size to be saved to NVM, a timestamp or other indication, such as an epoch, is saved to NVM as part of the portion of the journal. In various embodiments, the epoch stored with a portion of the journal is associated with a particular one of the entries in the portion of the journal, and the epoch correlates the translation represented by the particular entry with a corresponding position of user data in a data band stored in the NVM.

In some embodiments, when the journal has reached the maximum journal size, a number of oldest entries in the journal (e.g., at the head of the journal) are deleted and space used by the oldest entries is reclaimed for other uses. For example, in some embodiments, when the journal reaches the maximum journal size, a last (oldest) NVM page used to store the journal is deleted and space used by the last NVM page is reclaimed for other uses.

In various embodiments, at least a portion of the second-level map pages are shadowed and/or cached in a volatile memory of the SSD controller, such as on-chip SRAM or external DRAM. If all of the second-level map pages are shadowed and/or cached, an individual one of the second-level map pages is accessed via its first-level map index, such as by using the first-level map index as an array index into an array of the second-level map pages. If only a portion of the second-level map pages are shadowed and/or cached, an individual one of the second-level map pages is accessed according to its first-level map index, such as by using the first-level map index as a look-up key in a hash table or other look-up data structure.

In some embodiments which do not use a journal, when a host write arrives at the SSD, an LBA of the write is associated via the two-level map with a corresponding second-level map entry, the corresponding second-level map entry is updated with a determined physical location in the non-volatile memory to store data of the host write, a particular one of the second-level map pages containing the corresponding second-level map entry is saved non-volatility, and the first-level map entry associated with the particular second-level map page is updated to store a physical location of the particular second-level map page. Periodically, the first-level map is saved non-volatility. Periodically, the saved second-level map pages are garbage collected. The map write amplification due to this is a combination of saving one of the second-level map pages per host write, the periodic saving of the first-level map, and the garbage collection of the second-level map. In general, the second level map is the only part of the FTL stored non-volatility upon which garbage collection needs to be performed. The rest of the FTL stored non-volatility comprises journaled data which does not need garbage collection. Because the rest of the FTL stored non-volatility comprises journaled data, a controller implementing the FTL is enabled to limit garbage collection for portions of the FTL stored non-volatility to the second-level map pages. Recovery time is according to how frequently the first-level map is saved, because recovery needs to restore the first-level map to be consistent with the saved second-level map pages.

Figure 8:
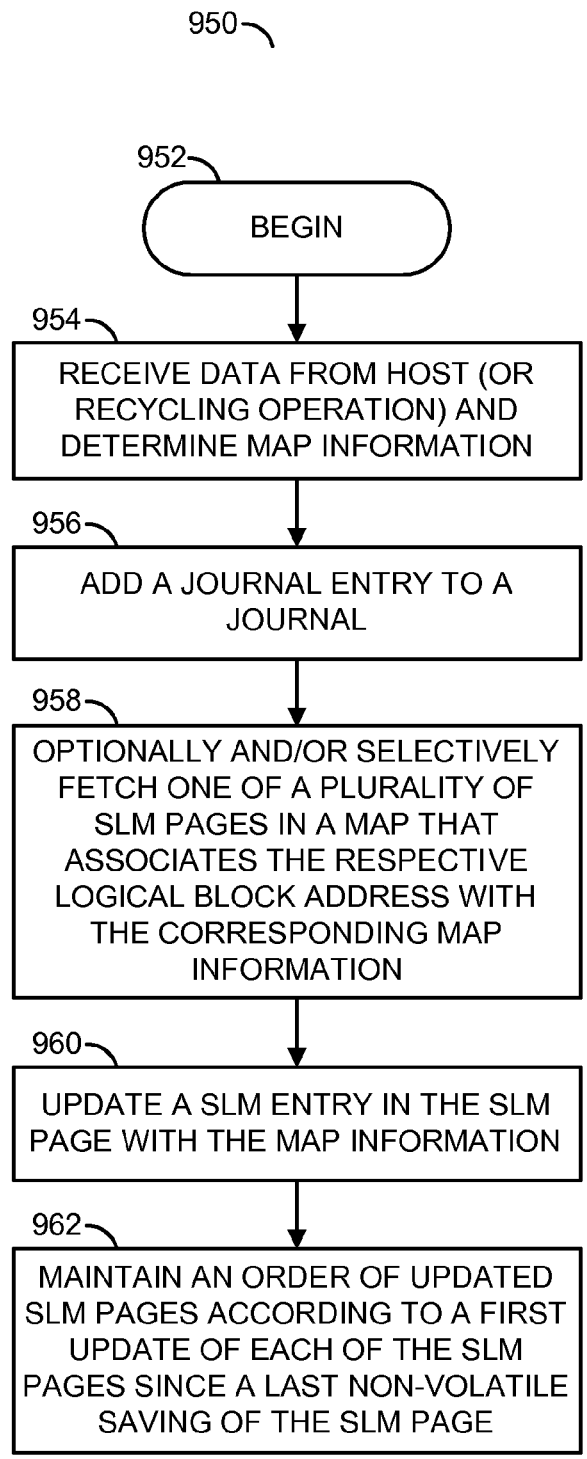
FIG. 8 is a flow diagram illustrating selected details of a mapping process associated with receiving and writing data from a host to NVM in accordance with an embodiment of the invention.

Referring to FIG. 8, a flow diagram is shown illustrating a mapping process associated with receiving and writing data from a host to NVM in accordance with embodiments of the invention. The process (or method) 950 is implemented by the circuits 100 and 199. The method 950 generally comprises a step (or state) 952, a step (or state) 954, a step (or state) 956, a step (or state) 958, a step (or state) 960, and a step (or state) 962. The steps 952 to 982 may represent modules and/or blocks that may be implemented as hardware, software, a combination of hardware and software, or other implementations. The sequence of the steps is shown as a representative example. Other step orders may be implemented to meet the criteria of a particular application.

In some embodiments, a plurality of host writes are received by an I/O device, such as an SSD. Each of the host writes comprises a respective logical block address (LBA) in a logical block address space and respective data. The process 950 starts in the step 952 upon receipt of a host write command (or write request). The processing is also applicable to data sourced from recycling operations. In the step 954, the host (or recycling) data is obtained. For each of the host write command (or a recycling operation data production), the I/O device determines corresponding map information comprising a respective physical location in a non-volatile memory of the I/O device for the respective data. In some embodiments, receiving and writing data from a host (or recycling operation) and mapping the data may be performed using processing techniques similar to the processing techniques described in U.S. Provisional Application No. 61/781,744, filed Mar. 14, 2013, and which is hereby incorporated by reference in its entirety.

The process 950 also performs one or more of the steps 956-962. In the step 956, the process 950 adds a journal entry to a journal. The journal entry comprises the respective logical block address and the corresponding map information. In the step 958, the process 950 optionally and/or selectively fetches one of a plurality of second-level map pages in a map that associates the respective logical block address with the corresponding map information. In the step 960, the process 950 updates a second-level map entry in the second-level map page with the map information. In the step 962, the process 950 maintains an order of updated ones of the second-level map pages according to a first update of each of the second-level map pages since a last non-volatile saving of the second-level map page.

Figure 9:
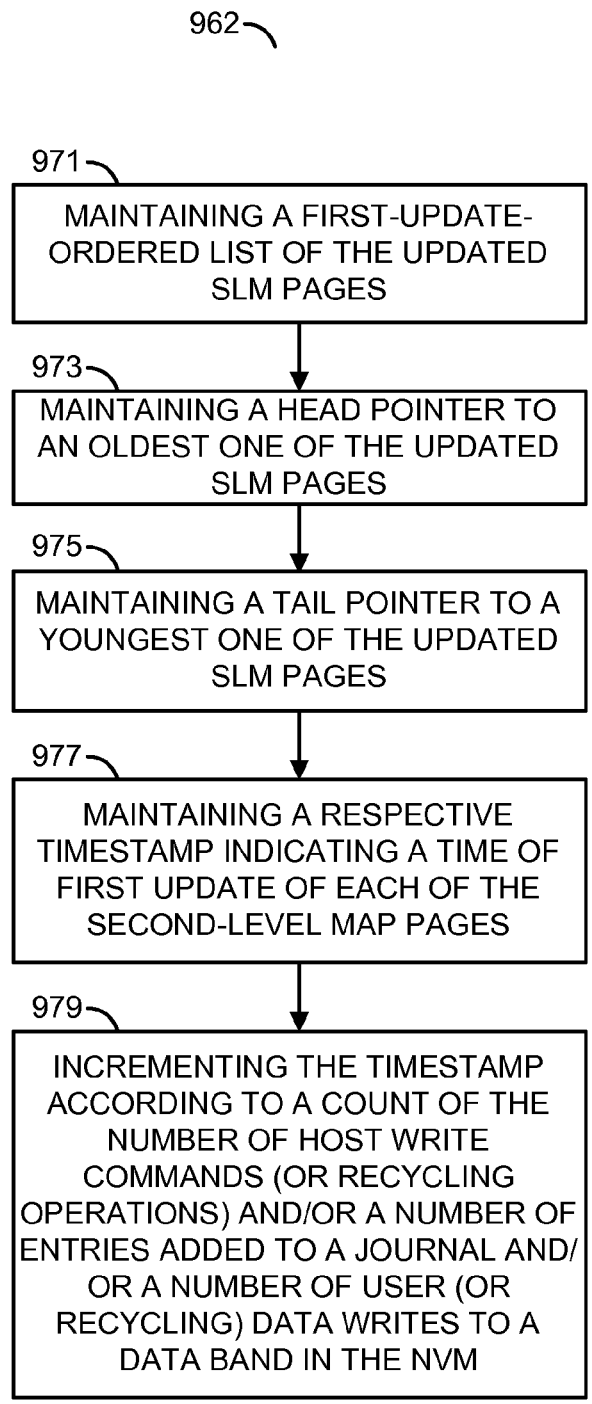
FIG. 9 is a flow diagram illustrating selected details of a process for maintaining an order of SLM pages in accordance with an embodiment of the invention.

Referring to FIG. 9, a flow diagram is shown illustrating a process for maintaining the order of updated ones of the second-level map pages in accordance with embodiments of the invention. In further embodiments, the step 962 of maintaining the order of updated ones of the second-level map pages comprises one or more of a step (or state) 971, a step (or state) 973, a step (or state) 975, a step (or state) 977, and a step (or state) 979. The steps 971 to 979 may represent modules and/or blocks that may be implemented as hardware, software, a combination of hardware and software, or other implementations. The sequence of the steps is shown as a representative example. Other step orders may be implemented to meet the criteria of a particular application.

The step 971 generally comprises maintaining a first-update-ordered list of the updated second-level map pages. The step 973 generally comprises maintaining a head pointer to an oldest one of the updated second-level map pages. The step 975 generally comprises maintaining a tail pointer to a youngest one of the updated second-level map pages. The step 977 generally comprises maintaining a respective timestamp indicating a time of first update of each of the second-level map pages. In various embodiments, the timestamp corresponds to an epoch associated with the one of the host writes that caused the particular update. The step 979 generally comprises incrementing the timestamp according to a count of the number of host write commands (or recycling operations) and/or a number of entries added to a journal and/or a number of user (or recycling) data writes to a data band in the NVM.

For example, each of the shadowed and/or cached second-level map pages has an associated link and an associated timestamp. Initially, such as after copying one of the second-level map pages from NVM into volatile storage, the link is NULL and the timestamp is invalid (such as by being zero or infinite). Initially a head pointer and a tail pointer are NULL. When a first second-level map page is updated, the head pointer and the tail pointer are both set to point at the first second-level map page (e.g., by storing the corresponding first-level map index in the head pointer and in the tail pointer), the timestamp of the first second-level map page is set to a current timestamp, and a link field of the first second-level map page is set to NULL.

When a second second-level map page is updated, the head pointer is not changed. No further changes are done if the second second-level map page is already in the first-update-ordered list (e.g., has a valid timestamp). If the second second-level map page is not in the first-update-ordered list, then the link field of the second-level map page pointed to by the tail pointer is set to point to the second second-level map page, the tail pointer is set to point to the second second-level map page, the timestamp of the second second-level map page is set to the current timestamp, and a link field of the second second-level map page is set to NULL.

Figure 10:
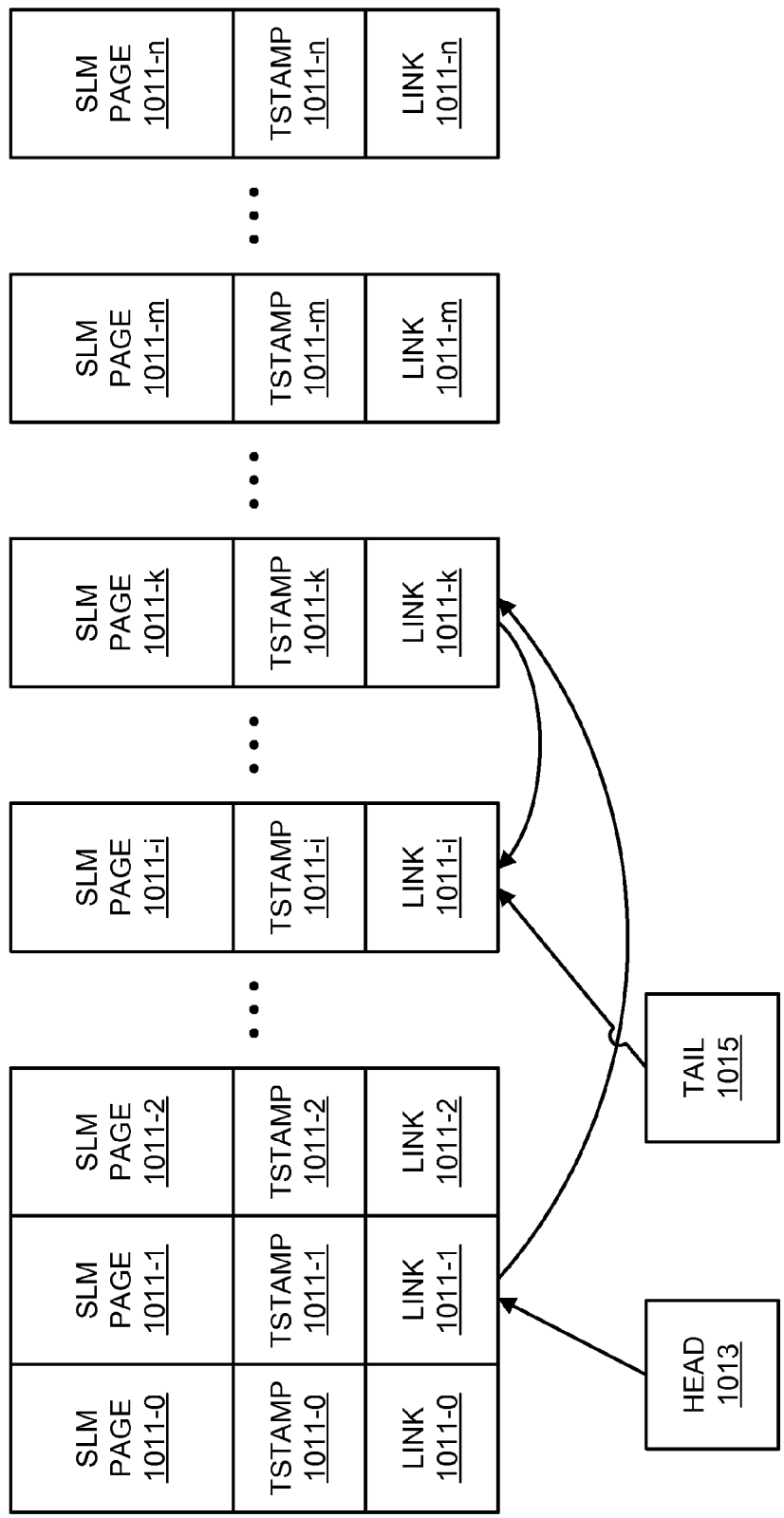
FIG. 10 is a diagram illustrating selected details of an embodiment of shadowed and/or cached SLM pages after a third SLM page is updated.

Referring to FIG. 10, a diagram is shown illustrating selected details of an embodiment of shadowed and/or cached SLM pages after a third SLM page is updated. After a third second-level map page is updated, the shadowed and/or cached second-level map pages may be associated (e.g., arranged in a linked list) as illustrated in FIG. 10.

Figure 11:
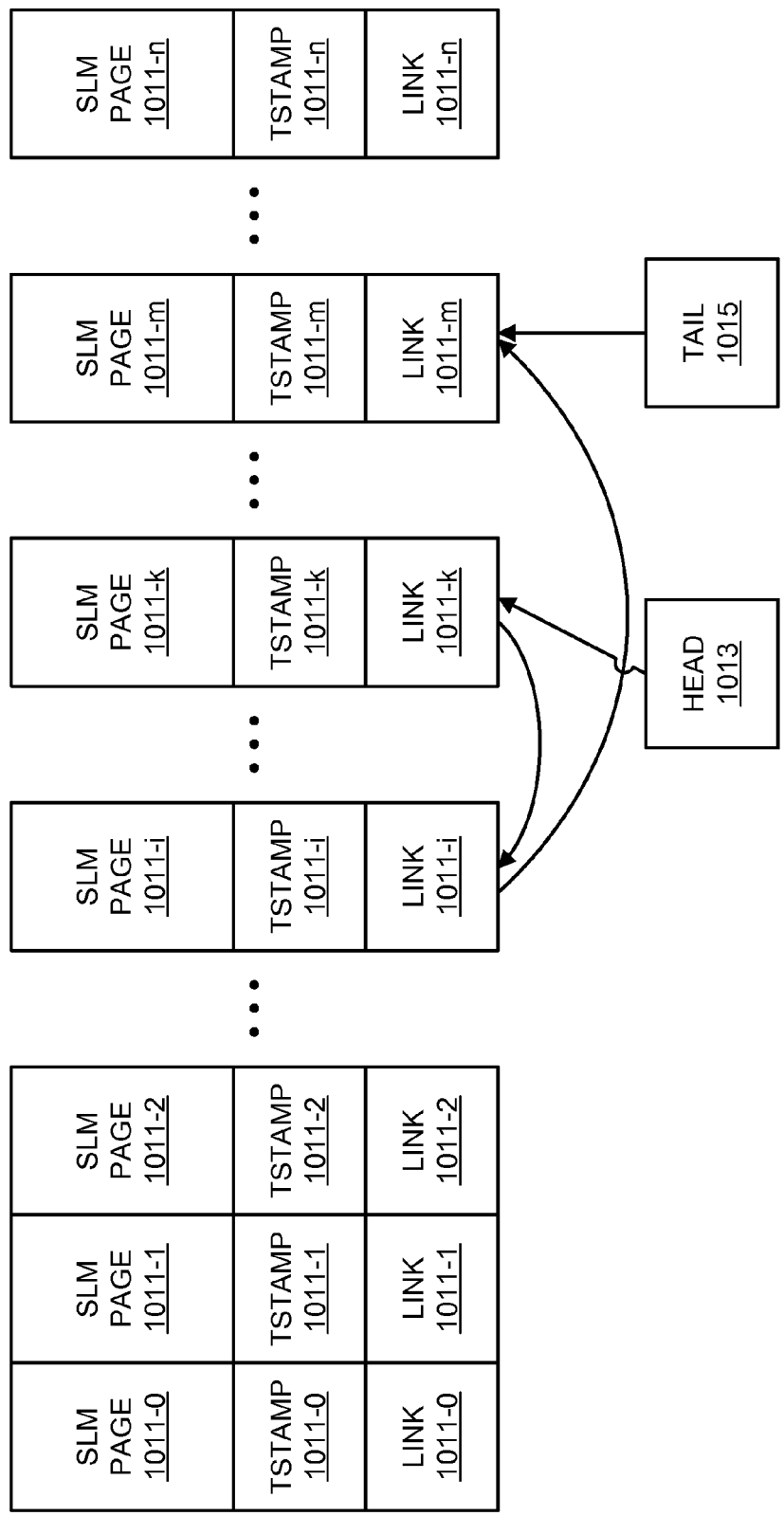
FIG. 11 is a diagram illustrating selected details of an embodiment of shadowed and/or cached SLM pages after a fourth SLM page is updated and an oldest SLM page is removed from a first-update-ordered list.

Referring to FIG. 11, a diagram is shown illustrating selected details of an embodiment of shadowed and/or cached SLM pages after a fourth SLM page is updated and an oldest SLM page is removed from a first-update-ordered list. After a fourth second-level map page is updated and the oldest second-level map page is removed from the first-update-ordered list, the shadowed and/or cached second-level map pages may form a linked list as illustrated in FIG. 11.

While the illustrative embodiments of FIGS. 10 and 11 conceptually show the SLM pages as adjacent to each other and/or to the timestamps and/or to the link fields, the data structure represented by FIGS. 10 and 11 may be implemented in numerous ways. In a first example, the SLM pages shown in FIGS. 10 and 11 are pointers to the (shadowed) copies of the SLM pages. In a second example, the shadowed copies of the SLM page are each allocated additional space to provide storage for the timestamp and link fields.

Figure 12:
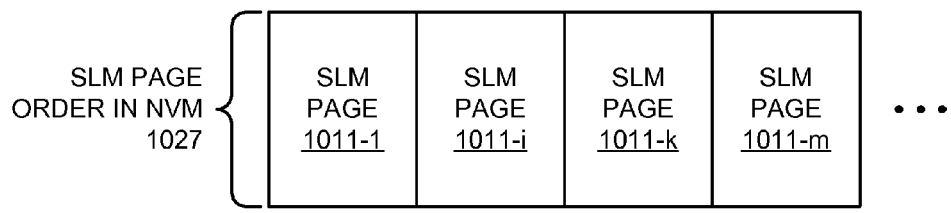
FIG. 12 is a diagram illustrating selected details of an embodiment of a storage order of the SLM pages in the NVM.

Referring to FIG. 12, a diagram is shown illustrating selected details of an embodiment of a storage order of the SLM pages in the NVM. In some embodiments, periodically, such as once per host write, the timestamp field of the second-level map page pointed to by the head pointer is compared with the current timestamp. If the timestamp field of the second-level map page pointed to by the head pointer lags the current timestamp by more than a specified amount, then the header pointer is saved in a temporary location, the second-level map page pointed to by the head pointer is removed from the first-update-ordered list by advancing the head pointer to point at the second-level map page pointed to by the link field of the second-level map page pointed to by the saved head pointer. The second-level map page pointed to by the saved head pointer (which was just removed from the first-update-ordered list) is saved to non-volatile memory, the timestamp field of the second-level map page pointed to by the saved head pointer is set to invalid, and the link field of the second-level map page pointed to by the saved head pointer is set to NULL. According to various embodiments, the specified amount is one or more of: equal to the maximum journal size; according to the maximum journal size; a value based at least in part on the maximum journal size; and a value calculated such that none of the second-level map pages contains an update that is older than the oldest entry in the journal.

In various embodiments, according to the periodic timestamp field comparison and associated selective saving of the shadowed and/or cached copies of the second-level map pages to NVM, an order of the saving of the second-level map pages to the NVM corresponds to the maintained order of first update. Continuing the examples above after the first four updated second-level map pages are saved in NVM, an order of the second-level map pages in NVM may be illustrated by the SLM page order in NVM 1027.

If the shadowed and/or cached copy of the second-level map pages is not all of the second-level map pages, the issue of replacement of second-level map pages needs to be addressed. When there is a miss in the cached copy of the second-level map, a second-level map page in the cached copy of the second-level map is selected for replacement. According to various embodiments, there are multiple ways to select one of the cached second-level map pages to be replaced. In one example, all of the clean (not in the first-update-ordered list) second-level map pages are maintained in a "clean" list, and one of the entries in the "clean" list is selected. In another example, a doubly-linked list of entries is maintained in "least-recently-used" order, and the least-recently used entry in the doubly-linked list is selected. The first-update-ordered list is also doubly-linked as the least-recently used second-level map page is possibly almost any of the second-level map pages. In yet another example, a random one of the second-level map pages is selected. The first-update-ordered list is also doubly-linked as the random second-level map page is possibly any of the second-level map pages. In still another example, the last second-level map page in the first-update-ordered list (the second-level map page pointed to by the head pointer) is selected, potentially flushing the second-level map page pointed to by the head pointer earlier than the respective timestamp would indicate. If the selected second-level map page is dirty (updated), the selected second-level map page is flushed to NVM (as if the respective timestamp had expired).

Typically, a number of entries in a first-level map is according to one or more of (i) an amount of memory available to store the first-level map, such as an amount of on-chip SRAM or external DRAM, and (ii) a write amplification factor due to periodic saving of the first-level map, which is generally saved every several hundred MB of second-level map page writes to bound recovery time. Typically, a maximum journal size is according to an amount of time needed to replay the journal at the start of recovery. Generally, firmware-based techniques are enabled to replay the journal at rates approaching 1M journal entries per second, and hardware-based techniques are enabled to replay the journal at rates approaching 10M journal entries per second.

An average number of updates per second-level map page is a ratio of the maximum journal size (in entries) divided by a number of entries in the first-level map—this ratio is termed $\lambda$, as in the average used in a Poisson process. The distribution of updates among the second-level map page is according to a Poisson process, however modified by "pruning" the oldest second-level map pages. Typically, a number of updates in the oldest second-level map page is $1+\lambda$, hence there is aggregation of updates in the second-level map pages, reducing a map write amplification due to saving the second-level map pages in NVM (amortizing a cost of saving the oldest second-level map page among an average number of updates greater than 1). As the maximum journal size increases, $\lambda$ increases and amortization improves decreasing map write amplification. However, recovery time is also increased.

Typically, as the maximum journal size is increased, an absolute benefit of the combined journaling and two-level mapping compared to journaling alone decreases because the larger journal size reduces map write amplification in and of itself. However, the larger maximum journal sizes have much longer recovery times. The combined journaling and two-level mapping advantageously enables reduced map write amplification compared to journaling alone with a much smaller maximum journal size.

Typically, if the maximum journal size is one quarter or more a size of the first-level map (measured in entries), the aggregation advantages of the combined journaling and two-level mapping lead to significantly lower write amplification than just using two-level map without journaling. If the maximum journal size is comparable to a number of entries in the first-level map, then map write amplification is reduced by about a factor of two compared to two-level mapping without journaling.

In some embodiments, during periods of light or no host activity, the oldest second-level map pages in the first-update-ordered list are flushed to NVM and removed from the first-update-ordered list. Flushing the oldest second-level map pages in the first-update-ordered list potentially increases write amplification, but at a time when host activity is low. Flushing the oldest second-level map pages in the first-update-ordered list advantageously decreases a need to flush the second-level map pages at a start of a sudden burst of host activity. In further embodiments, only second-level map pages which have accumulated multiple updates are flushed. For example, in some embodiments, each second-level map page is associated with a respective 1-bit, 2-bit, or other small size, saturating counter to count a number of updates to the second-level map page, and only second-level map pages having reached a specified threshold of updates are flushed. In still further embodiments, older ones of the second-level map pages having reached a specified threshold of updates are preferentially flushed rather than younger ones of the second-level map pages having reached a specified threshold of updates. In yet further embodiments, maintaining the first-update-ordered list as a doubly-linked list enables removing some entries according to criteria such as the number of accumulated updates, while leaving other entries in the first-update-ordered list to accumulate further updates.

In some embodiments, when the I/O device is notified of a shutdown and/or when told to save any volatile state, the I/O device performs one or more of: flushing any journal entries stored in volatile memory to non-volatile memory, such as by padding a partially-full buffer of journal entries to an NVM page boundary and writing the buffer to an NVM page; flushing any dirty (modified) second-level map pages stored in volatile memory to non-volatile memory; flushing at least some portion of a first-level map stored in volatile memory to non-volatile memory; flushing other data structures stored in volatile memory to non-volatile memory; writing a log message or other similar indication to non-volatile memory indicating a clean shutdown was performed. In further embodiments, a cost (in time) to save second-level map pages to NVM is traded off against a cost (in time) to replay the journal. For example, the more second level map pages are saved in NVM (e.g., starting from the oldest second-level map pages in the first-update-ordered list), the less journal entries need to be replayed to recover the map. Conversely, the less second level map pages are saved in NVM, the more journal entries need to be replayed to recover the map. In even further embodiments, no second-level map pages are explicitly saved in the event of a shutdown. In some embodiments and/or usage scenarios, when the I/O device is notified of a power failure or imminent loss of power, only user data from host writes (as opposed to recycled user data) stored in volatile memory is saved to non-volatile memory.

Figure 13:
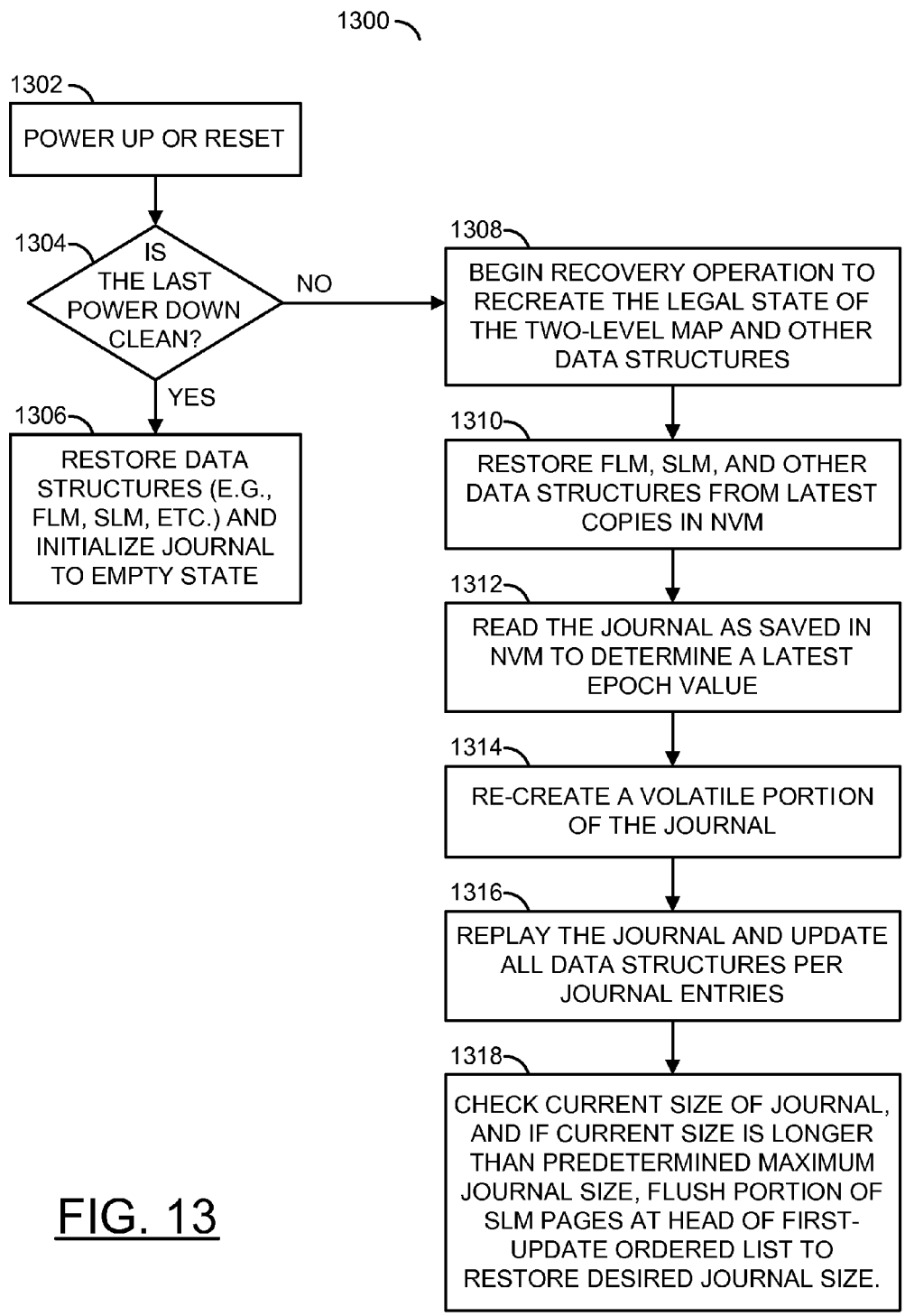
FIG. 13 is a flow diagram illustrating selected details of an example recovery process in accordance with an embodiment of the invention.

Referring to FIG. 13, a flow diagram is shown illustrating an example recovery process in accordance with an embodiment of the invention. The process (or method) 1300 is implemented by the circuits 100 and 199. The method 1300 generally comprises a step (or state) 1302, a step (or state) 1304, a step (or state) 1306, a step (or state) 1308, a step (or state) 1310, a step (or state) 1312, a step (or state) 1314, a step (or state) 1316, a step (or state) 1318 and a step (or state) 1320. The steps 1302 to 1320 may represent modules and/or blocks that may be implemented as hardware, software, a combination of hardware and software, or other implementations. The sequence of the steps is shown as a representative example. Other step orders may be implemented to meet the criteria of a particular application.

The process 1300 generally starts in the step 1302 in response to an event after a malfunction (e.g., a recovery/rebuild request, a soft or hard reset, or a power-on). In some embodiments, when power is applied to the I/O device and/or the I/O device is reset, the I/O device is enabled to restore a legal state of the map and other data structures. In the step 1304, the process 1300 checks for a log message or other similar indication from the non-volatile memory indicating a clean shutdown was performed. If the I/O device reads the log message or other similar indication from non-volatile memory indicating a clean shutdown was performed, then data structures such as the first-level map were properly saved and the process 1300 moves to the step 1306, where data structures such as the first-level map are restored from the non-volatile memory, and the journal is initialized to an empty state. If the log message or other similar indication from non-volatile memory indicating a clean shutdown was performed is not found, then the process 1300 moves to the step 1308 and begins a recovery operation to recreate the legal state of the map and other data structures.

In the step 1308, the recovery operation, in the usage scenario where the entire second-level map is stored in DRAM, comprises one or more of the steps 1310-1320. In the step 1310, the process 1300 restores the first-level map, the second-level map, and other data structures from the latest copies in the NVM. In the step 1312, the process 1300 reads the journal as saved in the NVM to determine a latest epoch value in the journal. In the step 1314, the process 1300 re-creates a volatile portion of the journal by reading self-journaling information in the data band of data writes having an epoch subsequent to the last saved journal entry. In the step 1316, the process 1300 replays the journal from a presumed oldest journal entry to the newest (including the recreated journal entries stored in volatile memory) and updates all data structures per the journal entries. In the step 1318, the process 1300 checks the current size of the journal, and if the current size of the journal is longer than the maximum journal size, then a portion of the second-level map pages at the head of the first-update-ordered list are flushed to restore the desired, maximum journal size.

Updating the data structures also includes recreating a first-update-ordered list based on the journal entries. A journal entry which matches the corresponding second-level map contents, however, has already been saved non-volatility and is not treated as an update. The presumed oldest journal entry is determined according to the epoch of the newest journal entry and the maximum journal size which specify an oldest journal entry that is possibly more recent than saved second-level map entries. The oldest journal entry is a first journal entry that necessitates updating the second-level map, and the oldest journal entry determines a current size of the journal after recovery. If the recreated journal entries stored in volatile memory are longer than a desired length, such as more than an NVM page, an older part of the recreated journal entries are flushed to NVM. The procedure if the entire second-level map is not stored in DRAM is similar, and involves dynamically loading and possibly flushing second-level map pages rather than having all of the second-level map pages resident in DRAM.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of associating a logical block address space with a physical address space of a non-volatile memory comprising:
  in response to a write request comprising a respective logical block address in the logical block address space and respective data to be written to the non-volatile memory, determining a physical location in the non-volatile memory to store the respective data of the write request;
  adding an entry to a journal, the added entry trailing any entries already in the journal, wherein the added entry has a respective logical block address field set to the respective logical block address of the write request and a respective physical location field set to the determined physical location; and
  updating one of a plurality of second-level map pages in a two-level map according to the respective logical block address of the write request with the determined physical location, wherein the two-level map is formed by each of the plurality of second-level map pages being associated with a respective one of a plurality of first-level map entries, each of the second-level map pages comprises a plurality of respective second-level map entries, and each of the second-level map entries is enabled to associate a particular logical block address in the logical block address space with a particular physical location in the non-volatile memory.

2. The method according to claim 1, further comprising:
  maintaining an order of the second-level map pages according to an order in which the second-level map pages were first updated by the updating step since last being saved to the non-volatile memory, wherein a head pointer to an oldest one of the updated second-level map pages and a tail pointer to a most recent one of the updated second-level map pages are maintained; and
  saving the second-level map pages to the non-volatile memory according to the maintained order, wherein the saving of the second-level map pages is, at least in part, according to a predefined depth of the journal.

3. The method according to claim 2, further comprising: periodically saving at least a portion of the first-level map entries to the non-volatile memory.

4. The method according to claim 2, wherein saving the second-level map pages comprises updating the first-level map entries associated with the saved second-level map pages with respective physical locations in the non-volatile memory of the saved second-level map pages.

5. The method according to claim 2, further comprising: periodically saving a portion of the journal in the non-volatile memory; and
according to saving the second-level map pages, deallocating a head portion of the journal saved in the non-volatile memory.

6. The method according to claim 5, wherein deallocation of the head portion is configured to maintain a number of entries in the journal no greater than the predefined depth.

7. The method according to claim 5, further comprising: in response to at least one of powering-on and resetting an I/O device comprising the non-volatile memory, determining if a previous shutdown state in the non-volatile memory was a clean shutdown state; and
if the previous shutdown state was not the clean shutdown state, replaying at least a portion of the journal saved in the non-volatile memory.

8. The method according to claim 7, wherein replaying the at least a portion of the journal saved in the non-volatile memory comprises updating one or more of the second-level map entries in the second-level map pages according to entries of the at least a portion of the journal saved in the non-volatile memory.

9. An apparatus comprising:
a non-volatile memory; and
a controller operatively coupled to the non-volatile memory, wherein in response to receiving a write request comprising a respective logical block address in a logical block address space and respective data to be written to the non-volatile memory, the controller is enabled to
determine a physical location in the non-volatile memory to store the respective data of the write request,
add an entry to a journal, wherein the added entry trails any entries already in the journal, each of the entries in the journal comprises a respective logical block address field and a respective physical location field, the added entry has the respective logical block address field set to the respective logical block address of the write request and the respective physical location field set to the determined physical location in the non-volatile memory storing the respective data of the write request, and
update one of a plurality of second-level map pages in a two-level map according to the respective logical block address of the write request with the determined physical location, wherein the two-level map is formed by each of the plurality of second-level map pages being associated with one of a plurality of first-level map entries, each of the second-level map pages comprises a plurality of respective second-level map entries, and each of the second-level map entries is enabled to associate a particular logical block address in the logical block address space with a particular physical location in the non-volatile memory.

10. The apparatus according to claim 9, wherein the controller is further enabled to:
maintain an order of the second-level map pages according to an order in which the second-level map pages were first updated since last being saved to the non-volatile memory, wherein a head pointer to an oldest one of the updated second-level map pages and a tail pointer to a most recent one of the updated second-level map pages are maintained; and
save the second-level map pages to the non-volatile memory according to the maintained order, wherein the saving of the second-level map pages is, at least in part, according to a depth of the journal.

11. The apparatus according to claim 10, wherein saving the second-level map pages comprises updating the first-level map entries associated with the saved second-level map pages with respective physical locations in the non-volatile memory of the saved second-level map pages.

12. The apparatus according to claim 10, wherein the controller is further enabled to periodically save a portion of the journal in the non-volatile memory.

13. The apparatus according to claim 12, wherein the controller is further enabled to:
determine whether a previous shutdown state in the non-volatile memory was a clean shutdown state in response to at least one of powering-on and resetting the apparatus; and
if the previous shutdown state was not the clean shutdown state, replay at least a portion of the journal saved in the non-volatile memory.

14. The apparatus according to claim 13, wherein replaying the at least a portion of the journal saved in the non-volatile memory comprises updating one or more of the second-level map entries in the second-level map pages according to entries of the at least a portion of the journal saved in the non-volatile memory.

15. The apparatus according to claim 9, wherein the controller is further enabled to limit garbage collection on portions of a flash translation layer stored in the non-volatile memory to the second-level map pages.

16. The apparatus according to claim 9, further comprising a dynamic random access memory (DRAM) operatively coupled to the controller and configured to store all of the second-level map pages.

17. The apparatus according to claim 9, further comprising a static random access memory (SRAM) operatively coupled to the controller and configured to store the journal.

18. The apparatus according to claim 9, wherein the apparatus is a solid-state drive (SSD).

19. An apparatus comprising:
a device interface configured to process a plurality of read/write operations to/from a non-volatile memory;
a controller operatively coupled to the device interface, wherein in response to receiving a write request comprising a respective logical block address in a logical block address space and respective data to be written to the non-volatile memory, the controller is enabled to
determine a physical location in the non-volatile memory to store the respective data of the write request,
add an entry to a journal, wherein the added entry trails any entries already in the journal, each of the entries in the journal comprises a respective logical block address field and a respective physical location field, the added entry has the respective logical block address field set to the respective logical block address of the write request and the respective physical location field set to the determined physical location in the non-volatile memory storing the respective data of the write request, and update one of a plurality of second-level map pages in a two-level map according to the respective logical block address of the write request with the determined physical location, wherein the two-level map is formed by each of the plurality of second-level map pages being associated with one of a plurality of first-level map entries, each of the second-level map pages comprises a plurality of respective second-level map entries, and each of the second-level map entries is enabled to associate a particular logical block address in the logical block address space with a particular physical location in the non-volatile memory.

20. The apparatus according to claim 19, wherein the controller is further enabled to:

maintain an order of the second-level map pages according to an order in which the second-level map pages were first updated since last being saved to the non-volatile memory, wherein a head pointer to an oldest one of the updated second-level map pages and a tail pointer to a most recent one of the updated second-level map pages are maintained; and save the second-level map pages to the non-volatile memory according to the maintained order, wherein the saving of the second-level map pages is, at least in part, according to a depth of the journal.

\* \* \* \* \*